(12) United States Patent
Sze et al.

(10) Patent No.: US 11,792,449 B2
(45) Date of Patent: *Oct. 17, 2023

(54) SYSTEM AND METHOD FOR CONTROLLING DATA STREAM MODIFICATIONS

(71) Applicant: DEJERO LABS INC., Waterloo (CA)

(72) Inventors: David Sze, Waterloo (CA); Jonathon Oberholzer, Waterloo (CA); Todd Schneider, Waterloo (CA); Bogdan Frusina, Kitchener (CA)

(73) Assignee: DEJERO LABS INC., Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/849,471

(22) Filed: Jun. 24, 2022

(65) Prior Publication Data

US 2022/0329882 A1 Oct. 13, 2022

Related U.S. Application Data

(63) Continuation of application No. 16/322,850, filed as application No. PCT/CA2017/050930 on Aug. 3, 2016, now Pat. No. 11,375,249.

(Continued)

(51) Int. Cl.
*H04N 21/2343* (2011.01)
*H04N 21/2365* (2011.01)
(Continued)

(52) U.S. Cl.
CPC ..... *H04N 21/2343* (2013.01); *H04N 21/2365* (2013.01); *H04N 21/4402* (2013.01); *H04N 21/6332* (2013.01); *H04N 21/8549* (2013.01)

(58) Field of Classification Search
CPC ...... H04H 60/04; H04H 20/10; H04H 20/103; H04H 20/14; H04N 21/2187; H04N 21/23418; H04N 5/222; H04N 5/262
See application file for complete search history.

(56) References Cited

U.S. PATENT DOCUMENTS

| 8,270,487 | B1 | 9/2012 | Kizhepat | H04N 21/234309 375/240.12 |
| 11,095,924 | B1 | 8/2021 | Chee | H04N 21/8456 |

(Continued)

FOREIGN PATENT DOCUMENTS

| EP | 2827333 A2 | 1/2015 |
| GA | 2917719 A1 | 1/2015 |

(Continued)

OTHER PUBLICATIONS

Canadian Intellectual Property Office (CIPO), International Search Report and Written Opinion dated Nov. 1, 2017 for PCT Application No. PCT/CA2017/050930.

(Continued)

*Primary Examiner* — Fernando Alcon
(74) *Attorney, Agent, or Firm* — Norton Rose Fulbright Canada LLP

(57) ABSTRACT

In some embodiments, there is provided a system for remotely processing data streams including: at least one transmitter configured for transmission of at least two data streams, the at least two data streams including at least a lower quality preview stream and a higher quality content stream. A plurality of editor computing devices is configured for receiving at least the lower quality preview stream and facilitating processing and editing on the lower quality preview stream, generating a set of machine-readable instructions representative of the processing and editing. A plurality of routing computing devices located from the at least one transmitter is configured for receiving at least the higher quality content stream and the set of machine-readable instructions, processing the higher quality content stream by encoding the higher quality content stream based on the set of machine-readable instructions to generate an output content stream.

24 Claims, 19 Drawing Sheets

Related U.S. Application Data

(60) Provisional application No. 62/370,489, filed on Aug. 3, 2016.

(51) Int. Cl.
  *H04N 21/4402* (2011.01)
  *H04N 21/6332* (2011.01)
  *H04N 21/8549* (2011.01)

(56) References Cited

U.S. PATENT DOCUMENTS

| | | | |
|---|---|---|---|
| 2002/0082837 A1* | 6/2002 | Pitman | G11B 20/10527 |
| | | | 704/270.1 |
| 2005/0254483 A1 | 11/2005 | Factor | |
| 2009/0052540 A1* | 2/2009 | Gutman | H04N 21/2365 |
| | | | 375/E7.189 |
| 2009/0069021 A1* | 3/2009 | Barroso | H04H 20/51 |
| | | | 455/12.1 |
| 2009/0119736 A1* | 5/2009 | Perlman | A63F 13/355 |
| | | | 725/133 |
| 2009/0144785 A1 | 6/2009 | Walker | |
| 2009/0290070 A1* | 11/2009 | Duke | H04N 5/222 |
| | | | 348/E5.022 |
| 2010/0250703 A1 | 9/2010 | Steadman | |
| 2011/0307929 A1* | 12/2011 | Youssefmir | H04N 21/2402 |
| | | | 725/89 |
| 2014/0359156 A1 | 12/2014 | Manber | H04N 21/2402 |
| | | | 709/231 |
| 2019/0108401 A1 | 4/2019 | Chen | G06K 9/00758 |
| 2020/0204849 A1 | 6/2020 | Loheide | H04N 21/8106 |

FOREIGN PATENT DOCUMENTS

| | | | | |
|---|---|---|---|---|
| GA | 2955979 | A1 | 2/2016 | |
| JP | 2002261710 | A | 9/2002 | |
| JP | 2008118271 | A | 5/2008 | |
| JP | 2008219489 | A | 9/2008 | |
| JP | 2008228313 | A | 9/2008 | |
| JP | 2010213119 | A | 9/2010 | |
| JP | 2014236465 | A | 12/2014 | |
| WO | 0205117 | A1 | 1/2002 | |
| WO | WO-2018197911 | A1 | 11/2018 | H04N 21/2187 |

OTHER PUBLICATIONS

Extended European Search Report issued in European Application No. 17836125.9, dated Dec. 18, 2019.
Japanese Office Action issued in Japanese Application No. 2019-506161, dated Jul. 20, 2021.
Japanese Patent Office, Notice of Reasons for Rejection to JP Application No. 2019-506161, dated Apr. 12, 2022.

* cited by examiner

SYSTEM AND METHOD FOR CONTROLLING DATA STREAM MODIFICATIONS

CROSS REFERENCES TO RELATED APPLICATIONS

This Application is a Continuation of U.S. application Ser. No. 16/322,850 filed on Feb. 1, 2019, which is a 371 US National Stage Application of PCT Application No. PCT/CA2017/050930, filed on Aug. 3, 2017 titled SYSTEM AND METHOD FOR CONTROLLING DATA STREAM MODIFICATIONS, which claims priority and benefit to U.S. Provisional Application No. 62/370,489, filed on Aug. 3, 2016 titled SYSTEM AND METHOD FOR REMOTE PROCESSING, the contents of all the above referenced applications are incorporated herein in their entirety.

FIELD

The embodiments described herein relate generally to data communications, and more particularly to systems, methods and computer program products for controlling data modifications to data communication including, but not limited to, streams of audio and/or video data.

BACKGROUND

Processing multiple streams of audio and video data is a common requirement in environments such as, but not limited to, television station control rooms. An original video source, such as a live feed from the field, may come into a control room, to have graphics and effects added to it, and have it mixed with other feeds, including advertisements, to ultimately be played out to air to the viewing public. Processing can be computationally intensive, and it may be desirable to reduce an overall processing time required, for example, in relation to live or near-live type broadcast feeds.

SUMMARY

Processing time and resources, especially in the context of time-sensitive transmissions (e.g., live broadcasts, live events, breaking news), is finite. There may be a balance between adding effects or conducting processing, and the temporal proximity to a live event. For example, it may be desirable to append language captions (e.g., a computer generated closed caption approximation of what a broadcaster is saying) or graphics (e.g., a yellow line indicating the yardage required for a "first down" in American football), in relation to a live sporting event. A tolerance for delay (e.g., 30 seconds) by the viewers may be available to append such data stream modifications.

Various embodiments are described here in directed to control and management of processing of data streams such that processing time and resources can be optimized. The embodiments can, for example, be implemented using processors configured for generating instruction sets for downstream processing of data streams (e.g., video streams). Inherent or actively adduced processing delays, transmission delays, etc., and coordinated management and control of resources may permit a greater range of processing options to be conducted within a given period of time. Some embodiments are further directed to distributing and allocating activities across cost-efficient distributed resources (e.g., utilizing off-peak availability).

A source data stream (e.g., a source video or audio) is provided for transmission, ultimately to various endpoints, such as consumers, customers, television channels, substantially "live" broadcast feeds, etc. This source data stream may require a level of processing before it is ready for transmission to the endpoints. However, this processing may be time and resource intensive, and computationally challenging (e.g., adding translations, subtitles, modifying graphics). This technical challenge is exacerbated where throughput across communication links are non-ideal (e.g., on a battlefield), and where the delivered stream is required to be transmitted in a high-definition format (e.g., a 4K transmission).

Various embodiments describe technical solutions whereby different timing control techniques, mechanisms, and processes are implemented using computer and networking components (e.g., processors, smart routers, network interfaces, network controllers, traffic congestion controllers). These control techniques, mechanisms, and processes, for example, can be utilized to allocate and assign processing tasks dynamically to various resources, and further, to allocate and assign communication links such that overall processing time can be reduced or otherwise managed.

The source data stream, in some embodiments, is split into a preview data stream (e.g., a low bitrate, uncompressed, downscaled stream), and a pre-processed data stream (e.g., a broadcast-quality, high resolution, compressed stream, that is in a pre-processed or pre-processing form). The splitting and generation of the preview and the pre-processed data streams, for example, can be performed by various encoders working together, encoding the source data stream under different encoding characteristics and criteria. The pre-processed stream may still require additional processing to be conducted.

A scalable encoder can be used to generate the pre-processed data stream, the scalable encoder enabling scaling between different levels of processing complexity and options such that the scalable encoder allows for the overall amount of encoding (and thus the time required for encoding) to be scaled.

In some embodiments, the preview data stream is generated with minimal delay (e.g., perhaps with downscaling, no/minor levels of compression), and may be transmitted across a prioritized network connection (e.g., low latency, potentially higher cost) to a set of controlling devices (e.g., editor computing devices), which receive the preview data stream and initiate processing of the preview data stream to generate instruction sets of processing instructions based on different types of processing that is required prior to any data stream being provided to an endpoint. In other embodiments, the preview data stream may simply be a raw source data stream.

The controlling devices (e.g., editor computing devices) are, in some examples, designed for conducting high-complexity processing operations (e.g., application of neural networks to identify swear words, graphics effects, screen annotations) and reducing and/or otherwise transforming the outputs from the high-complexity processing operations into a set of processing instructions (e.g., turn off audio track one between t=55 and t=5.55 due to an identified swear word, draw a circle centered at coordinates X and Y at frames 5-10 to represent the location of a hockey puck). The set of processing instructions, for example, may be simplified in some embodiments, representing lower-level actions (e.g., turn off sound, draw a square) required to be performed during processing, which the higher-level processing (e.g., neural network analysis to identify players based on image processing) can be conducted by the controlling devices. The instruction sets, for example, can be utilized to identify required processing, or to facilitate processing by identifying regions of interest (e.g., coordinate-based spatial areas of stream frames that will be good targets for placement of a scoreboard without substantially blocking play action).

The pre-processed data stream may be provided to data stream processing components for modification in accordance with the set of processing instructions.

This simplified set of processing instructions is provided to data stream processing components that process the pre-processed data stream to generate the output processed stream that can ultimately be consumed by various endpoints or used for downstream processing. The data stream processing components receive the simplified processing instructions and apply the modifications with minimal processing time required (e.g., due to the simplification of the instruction set relative to the original computationally complex tasks).

A timing difference in frame receipt occurs as a result of the potentially different computing treatment received by the preview data stream and the pre-processed data stream, or different networking connections utilized for transmission. For example, the pre-processed data stream, by virtue of greater bandwidth requirements, may be transmitted along slower, but higher throughput connections. Accordingly, corresponding frames of the preview data stream and the pre-processed data stream may be shifted in time relative to one another (e.g., due to encoding differences or routing differences). For example, the preview data stream may be temporally 45 s ahead of the pre-processed data stream.

In a non-limiting example, the preview data stream may be a downscaled, raw, or reduced framerate data stream that is minimally delayed, while the pre-processed data stream may be encoded for consumption, at a high bitrate/resolution, with various codecs and other transformative encoding applied. As a result of these differing encoding treatments, at least an inherent delay is introduced, in some embodiments. In other embodiments, an artificial, introduced delay can also be utilized, or a combination of artificial and inherent delays can be utilized.

This relative delay between streams provides an opportunity to use the earlier received preview data stream to simplify computationally intensive techniques, analyses, and transformations, while not significantly affecting the end-to-end time at which a transmission can be brought from the source feed to endpoints (e.g., consumers).

In some embodiments, it is desirable for the management of the simplified instruction set generation and processing activities to conform (e.g., fall within) a timing constraint derived, for example, from the time shifted difference between the preview data stream and the pre-processed data stream (e.g., 7 minutes). If the simplified instruction set generation and transmission can take place within a particular set of timing constraints, the instruction set can be relayed to the data stream processing devices for implementation without significantly impacting the time of delivery to endpoints. Accordingly, a potential benefit may be an improved end-to-end transmission time for quasi-live broadcasts wherein some level of computationally intensive processing is required, through deliberate coordination and orchestration of communication, processing and/or control functions that occur in relation to a preview stream and a pre-processed data stream.

The controlling device, may be comprised of multiple processing components that interoperate in generating the instruction set, and these multiple processing components may each have different availability, cost, performance, and speed characteristics. These multiple components may also be geospatially located, and may be remote from one another (e.g., as distributed cloud resources that are linked by way of network linkages).

The components may be part of a same network, or on different networks. For example, in a cloud-based computing implementation, the components may represent on-demand resources that are requested from a pool of resources, where a controlling device or other controller may be able to request resources and to send instructions/data streams for processing. In such an embodiment, a router may act as a controller and treat the computing resources as computing nodes provisioned from a virtual cluster of resources.

The operating characteristics, selection, provisioning, assignment, and allocation of tasks to specific processing components may be a factor in orchestrating the generation of the instruction sets. In some embodiments, a "cloud controller" is provided as a type of processing orchestration controller that is a central scheduler/router that dynamically maintains a data structure housing characteristics and information associated with each cloud computing component, networking interfaces, networking connections, among others. The processing orchestration controller may include control interconnections that may also control the encoding parameters associated with the generation of the preview data stream, and the pre-processed data stream.

The processing orchestration controller is configured with an overall management of processing activities, coordinated and orchestrated such that, in concert, the computing components, network connections, preview/pre-processed data stream encoders are able to meet a timing constraint in providing the final output data stream (e.g., to endpoints). Accordingly, the processing orchestration controller may traverse the data structure to, responsive to sensed and/or monitored events, assign, provision, de-provision, allocate, prioritize, deprioritize, un-allocate tasks to meet one or more timing constraints.

The processing orchestration controller may be configured for orchestrating pluralities of source video streams, and may be required to allocate and provision a limited set of computing resources accordingly in a balanced fashion to ensure that various timing constraints are met (e.g., an overall processing orchestration controller controlling multiple live broadcasts at a given time).

The processing orchestration controller, for example, may be a stand-alone unit (e.g., a smart router) or a special purpose computing device that includes one or more network connections and processors, storing a data structure (e.g., in a database) of processing characteristics. For example, the processing orchestration controller may control a software-defined wide area network, utilizing a mix of network internal and network external resources on an on-demand or by reservation basis, balancing load based on various factors, such as performance, cost, availability, etc.

The processing orchestration controller may transmit signals for controlling cloud computing resources (e.g., potentially edge nodes, or nodes in an outside network, such as a cloud computing cluster), and dynamically assign tasks to specific components/groups of components, and/or dynamically control timing sequences and schedules to meet the timing constraints. These cloud computing resources may, for example, be tasked with performing functions of editor computing devices/controlling devices identifying data stream modifications based on preview streams, data stream processing of a pre-processed streams, among others.

In the context of cloud computing, the geospatial features or "virtual distance" aspects of cloud computing resources can be further utilized by the processing orchestration controller in reducing overall costs, for example, by conducting various tasks of processing the preview data stream or the pre-processed data stream on computing devices that are otherwise being used for off-peak usage (e.g., there may be cheaper availability or cost savings).

In some embodiments, the processing orchestration controller is configured for actively management of the temporal constraints, rather than passive management. In these embodiments, the processing orchestration controller deliberately modifies characteristics of the generation of the pre-processed stream, or transmission thereof, to increase or decrease the time constraints such that the time constraints match an availability of currently available resources, or to reduce overall processing costs.

In an embodiment, there is provided a system for controlling data stream modifications, the system comprising: a controlling device receiving a preview data stream, the controlling device configured for generating, based on the preview data stream, one or more sets of processing instructions for modifying a pre-processed data stream; a data stream processing device configured to receive the pre-processed data stream and to apply one or more data modifications based at least on executing the one or more sets of processing instructions in processing the pre-processed data stream, the data stream processing device generating an output processed stream including the data modifications; wherein the preview data stream and the pre-processed data stream are both derived from a source video data stream; wherein receipt of the corresponding frames of the preview data stream and the corresponding frames of the pre-processed data stream is temporally shifted relative to one another at least in part due to one or more encoding differences between the preview data stream and the pre-processed data stream; and wherein the receipt of corresponding frames of the preview data stream by the controlling device occurs ahead of the receipt of corresponding frames of the pre-processed data stream by the data stream processing device.

In another embodiment, pre-processed data stream is a production quality data stream generated from the source video data stream.

In another embodiment, the system includes at least one receiver configured to receive the preview data stream and the pre-processed data stream as separate data streams.

In another embodiment, the system includes at least one receiver configured to receive the source video data stream; and a first encoder configured to generate the preview data stream from the source video data stream; and a second encoder configured to generate the pre-processed data stream from the source video data stream; wherein the preview data stream is generated at a lower bitrate than the pre-processed data stream.

In another embodiment, the second encoder includes a mechanism that delays transmission of the pre-processed data stream to the data stream processing device to cause temporal shifting of the receipt of the corresponding frames of the pre-processed data stream relative to the corresponding frames of the preview data stream.

In another embodiment, operating characteristics at least one of the first encoder and the second encoder are controllable to modify a time delay between the receipt of the corresponding frames of the preview data stream and the corresponding frames of the pre-processed data stream.

In another embodiment, the controlling device and the data stream processing device are configured for operation in a master-slave configuration, whereby the one or more sets of processing instructions represent uni-directional processing steps for execution by the data stream processing device; differences in encoding between the preview data stream and the pre-processed data stream result in a minimum time delay between the receipt of the corresponding frames of the preview data stream and the corresponding frames of the pre-processed data stream; and the controlling device is configured for identifying data modifications and generating the one or more sets of processing instructions representing the identified data modifications, which when executed by the data stream processing device, transform the pre-processed data stream into the output processed stream.

In another embodiment, the controlling device is configured to generate the one or more sets of processing instructions within a temporal constraint defined at least by the temporal shift between the receipt the corresponding frames of the preview data stream and the corresponding frames of the pre-processed data stream.

The system of claim 8, wherein each set of the one or more sets of processing instructions for modifying the pre-processed data stream includes at least a data structure having frame identifiers of frames of the pre-processed data stream selected for modification, and image or audio manipulation instructions associated with the selected frames of the pre-processed data stream.

In another embodiment, the controlling device is further configured to transmit at least one of the preview data stream and the one or more sets of processing instructions to a preview visualization device.

In another embodiment, the system further includes a processing orchestration controller configured for coordinating processing of the pre-processed data stream such that the generation of the output processed stream including the data modifications occurs within the temporal constraint.

In another embodiment, the processing orchestration controller is configured for selecting, from a plurality of cloud computing resources, a subset of the plurality of cloud computing resources for implementing or for use by at least one of the controlling device and the data stream processing device.

In another embodiment, the processing orchestration controller is further configured to control one or more networking connections between the cloud computing resources of the plurality of cloud computing resources, the processing orchestration controller controlling the one or more networking connections to modify an overall time required for generating one or more sets of processing instructions, the overall time falling within the temporal constraint.

In another embodiment, each cloud computing resource of the plurality of cloud computing resources is associated with corresponding geospatial characteristics, and wherein the processing orchestration controller, selects the subset of the plurality of cloud computing resources based at least in part on the geospatial characteristics of each cloud computing resource.

In another embodiment, the processing orchestration controller is configured to allocate specific cloud computing resources when required for processing, and configured to release the allocated cloud computing resources when the processing is complete.

In another embodiment, the processing orchestration controller is configured to allocate and subsequently release a rolling set of cloud computing resources selected from time-zone regions having off-peak usage.

In another embodiment, the geospatial characteristics of each cloud computing resource includes at least one of a geographical location, a time zone, and a networking latency for communications to and from the corresponding cloud computing resource.

In another embodiment, the processing orchestration controller, upon a determination that the processing is likely to exceed the temporal constraint given a present set of conditions, is configured to request prioritized networking resources.

In another embodiment, the processing orchestration controller is configured to control a duration of the temporal shift between the preview data stream and the pre-processed data stream.

In another embodiment, the generation of the one or more sets of processing instructions is conducted across a chain of cloud computing resources formed by the subset of the plurality of cloud computing resources, and wherein an expected end to end latency is periodically determined by aggregating a network latency from a source transmitter, a processing time required at each of the cloud computing resources, one or more network latencies between each of the cloud computing resources, and a network latency to the data stream processing device; and upon a determination that the expected end to end latency is greater than the temporal constraint, the processing orchestration controller is configured to initiate compensation actions to reduce the expected end to end latency such that the expected end to end latency falls within the temporal constraint.

In another embodiment, there is provided a method for controlling data stream modifications, the method comprising: receiving a preview data stream at a controlling device; generating, based on the preview data stream, one or more sets of processing instructions for modifying a pre-processed data stream; receiving the pre-processed data stream at a data stream processing device; applying one or more data modifications based at least on executing the one or more sets of processing instructions in processing the pre-processed data stream; and generating an output processed stream including the data modifications; wherein the preview data stream and the pre-processed data stream are both derived from a source video data stream; wherein receipt of the corresponding frames of the preview data stream and the corresponding frames of the pre-processed data stream is temporally shifted relative to one another at least in part due to one or more encoding differences between the preview data stream and the pre-processed data stream; and wherein the receipt of corresponding frames of the preview data stream by the controlling device occurs ahead of the receipt of corresponding frames of the pre-processed data stream by the data stream processing device.

In another embodiment, there is provided a computer-readable medium storing machine readable instructions, which when executed by a processor, cause the processor to execute steps of a method for controlling stream data modifications, the method comprising: receiving a preview data stream at a controlling device; generating, based on the preview data stream, one or more sets of processing instructions for modifying a pre-processed data stream; receiving the pre-processed data stream at a data stream processing device; applying one or more data modifications based at least on executing the one or more sets of processing instructions in processing the pre-processed data stream; and generating an output processed stream including the data modifications; wherein the preview data stream and the pre-processed data stream are both derived from a source video data stream; wherein receipt of the corresponding frames of the preview data stream and the corresponding frames of the pre-processed data stream is temporally shifted relative to one another at least in part due to one or more encoding differences between the preview data stream and the pre-processed data stream; and wherein the receipt of corresponding frames of the preview data stream by the controlling device occurs ahead of the receipt of corresponding frames of the pre-processed data stream by the data stream processing device.

In another embodiment, there is provided a processing orchestration controller for coordinating processing of a pre-processed data stream such that generation of an output processed stream including data modifications occurs within a temporal constraint, the processing orchestration controller comprising: a data storage configured to maintain a data structure storing one or more processing characteristics of a plurality of cloud computing resources and one or more network characteristics of a plurality of network connections; a computer-readable media; a first set of network interfaces coupling the processor to a transmitter configured to: generate a preview data stream provided to a controlling device configured for generating, based on the preview data stream, one or more sets of processing instructions for modifying the pre-processed data stream; and generate the pre-processed data stream; a second set of network interfaces coupling the processor to each cloud computing resource of the plurality of cloud computing resources; a processor configured to: select a subset of the plurality of cloud computing resources for generating the one or more sets of processing instructions representing the identified data modifications; transmit control signals for coordinating processing of the pre-processed data stream by the subset of cloud computing resources such that the generating of the one or more sets of processing instructions occurs within a temporal constraint defined at least by a temporal shift between the receipt the corresponding frames of the preview data stream and the corresponding frames of the pre-processed data stream; continuously monitor the one or more processing characteristics and the one or more network characteristics to determine an expected end to end latency; and responsive to a determination that the expected end to end latency is greater than the temporal constraint, initiate compensation actions to reduce the expected end to end latency such that the expected end to end latency falls within the temporal constraint; wherein the preview data stream and the pre-processed data stream are both derived from a source video data stream; and wherein generation, by the transmitter, of the corresponding frames of the preview data stream and the corresponding frames of the pre-processed data stream is temporally shifted relative to one another at least in part due to one or more encoding differences between the preview data stream and the pre-processed data stream.

In another embodiment, there is provided a controlling device for receiving a preview data stream and for generating, based on the preview data stream, one or more sets of processing instructions for modifying a pre-processed data stream to generate an output data stream, the controlling device comprising: a subset of cloud computing resources selected from a plurality of cloud computing resources for generating the one or more sets of processing instructions representing a set of identified data modifications; a coordination controller coordinating generation of the one or more sets of processing instructions by the subset of cloud computing resources such that the generation of the one or more sets of processing instructions occurs within a temporal constraint defined at least by a temporal shift between generation of corresponding frames of the preview data stream and corresponding frames of a pre-processed data stream.

In an embodiment, there is provided a system for remotely processing data streams, the system comprising: at least one transmitter configured for transmission of at least two data streams, the at least two data streams including at least a lower quality preview stream and a higher quality content stream; a plurality of editor computing devices remotely located from the at least one transmitter, each editor computing device including at least a processor and non-transitory computer readable memory, the plurality of editor computing devices receiving at least the lower quality preview stream, the plurality of editor computing devices configured for facilitating processing and editing on the lower quality preview stream, the processing and editing being used to generate a set of machine-readable instructions representative of the processing and editing; and a plurality of routing computing devices remotely located from the at least one transmitter, each routing computing device including at least a processor and non-transitory computer readable memory, the plurality of routing computing devices receiving at least the higher quality content stream and the set of machine-readable instructions, the plurality of routing computing devices configured for processing the higher quality content stream by encoding the higher quality content stream in accordance with the set of machine-readable instructions to generate an output content stream; and a controller computing device configured to select a subset of the plurality of editor computing devices based on monitored network characteristics, such that processing and editing is performed within a duration of delay between transmissions on the higher quality content stream relative to the lower quality preview stream.

In another embodiment, the duration of delay further includes an introduced delay between the transmissions on the higher quality content stream relative to the lower quality preview stream.

In another embodiment, the system further includes a plurality of delivery management computing devices, each of the delivery management computing devices configured for determining delivery characteristics to one or more endpoints and transmission of the output content stream to the one or more endpoints.

In another embodiment, the at least one transmitter includes a router operable to route the data streams between the plurality of editor computing devices and the plurality of routing computing devices.

In another embodiment, the at least one transmitter includes two parallel encoders and a scalable encoder that is configured for generation of the at least two data streams from a single content stream from a video source.

In another embodiment, the scalable encoder is configured to provide coding delays proportional to resolutions of the at least two data streams.

In another embodiment, the lower quality preview stream is provided in real or near-real time, and the higher quality content stream is provided with an introduced delay or an inherent delay.

In another embodiment, the processing and editing includes at least one of adding subtitles, adding graphical scoreboards, adding graphical icons, adding advertisements, adding overlays, curating and censoring.

In another embodiment, the at least one transmitter is configured for transmission of a metadata data stream, the metadata data stream being provided to the plurality of editor computing devices and processed in the generation of the set of machine-readable instructions.

In another embodiment, the system further includes a scheduler computing device, the scheduler computing device configured for monitoring transmission characteristics relating to arrival of the at least two data streams at the corresponding plurality of editor computing devices and the plurality of routing computing devices, and based on the monitored transmission characteristics, scheduling a transmission of data packets comprising the output content stream to at least one endpoint. In an embodiment, different communication paths are selected and used for transmission based on overall network conditions, and a first connection is utilized for transmission to the editor computing devices and a second connection is utilized for transmission to the routing computing devices, the first and second connection selected by a controller to send streams to an editing mechanism A to meet various criteria, such as latency, bandwidth, redundancy needs, among others.

In another embodiment, there is provided a method for remotely processing data streams, the method comprising: transmitting at least two data streams, the at least two data streams including at least a lower quality preview stream and a higher quality content stream; receiving, at a plurality of editor computing devices remotely located from the at least one transmitter, at least the lower quality preview stream, the plurality of editor computing devices configured for facilitating processing and editing on the lower quality preview stream, the processing and editing being used to generate a set of machine-readable instructions representative of the processing and editing; and receiving, at a plurality of routing computing devices remotely located from the at least one transmitter, at least the higher quality content stream and the set of machine-readable instructions, the plurality of routing computing devices configured for processing the higher quality content stream by encoding the higher quality content stream in accordance with the set of machine-readable instructions to generate an output content stream; and selecting a subset of the plurality of editor computing devices based on monitored network characteristics, such that processing and editing is performed within a duration of delay between transmissions on the higher quality content stream relative to the lower quality preview stream.

In another embodiment, the method includes determining delivery characteristics to one or more endpoints and controlling transmission of the output content stream to the one or more endpoints.

In another embodiment, the method includes simultaneously generating, by two parallel encoders and a scalable encoder, the at least two data streams from a single content stream from a video source.

In another embodiment, the method further includes providing coding delays proportional to resolutions of the at least two data streams.

In another embodiment, the method includes transmitting a metadata data stream, the metadata data stream being provided to the plurality of editor computing devices and processed in the generation of the set of machine-readable instructions.

In another embodiment, the method includes monitoring transmission characteristics relating to arrival of the at least two data streams at the corresponding plurality of editor computing devices and the plurality of routing computing devices, and based on the monitored transmission characteristics, scheduling a transmission of data packets comprising the output content stream to at least one endpoint. In an embodiment, different communication paths are selected based on overall network conditions, and a first connection is utilized for low quality preview and a second connection is utilized for a high quality stream, the first and second connection selected by a controller to send streams to an editing mechanism A to meet various criteria, such as latency, bandwidth, redundancy needs, among others.

In another embodiment, there is provided a computer-readable medium for remotely processing data streams, the computer-readable medium having machine-readable instructions stored thereon, which when executed by a processor, cause the processor to perform a method comprising: transmitting at least two data streams, the at least two data streams including at least a lower quality preview stream and a higher quality content stream; receiving, at a plurality of editor computing devices remotely located from the at least one transmitter, at least the lower quality preview stream, the plurality of editor computing devices configured for facilitating processing and editing on the lower quality preview stream, the processing and editing being used to generate a set of machine-readable instructions representative of the processing and editing; receiving, at a plurality of routing computing devices remotely located from the at least one transmitter, at least the higher quality content stream and the set of machine-readable instructions, the plurality of routing computing devices configured for processing the higher quality content stream by encoding the higher quality content stream in accordance with the set of machine-readable instructions to generate an output content stream; and selecting a subset of the plurality of editor computing devices based on monitored network characteristics, such that processing and editing is performed within a duration of delay between transmissions on the higher quality content stream relative to the lower quality preview stream.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure. Different combinations, variations, and arrangements of the disclosed features are contemplated.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Figure 1:
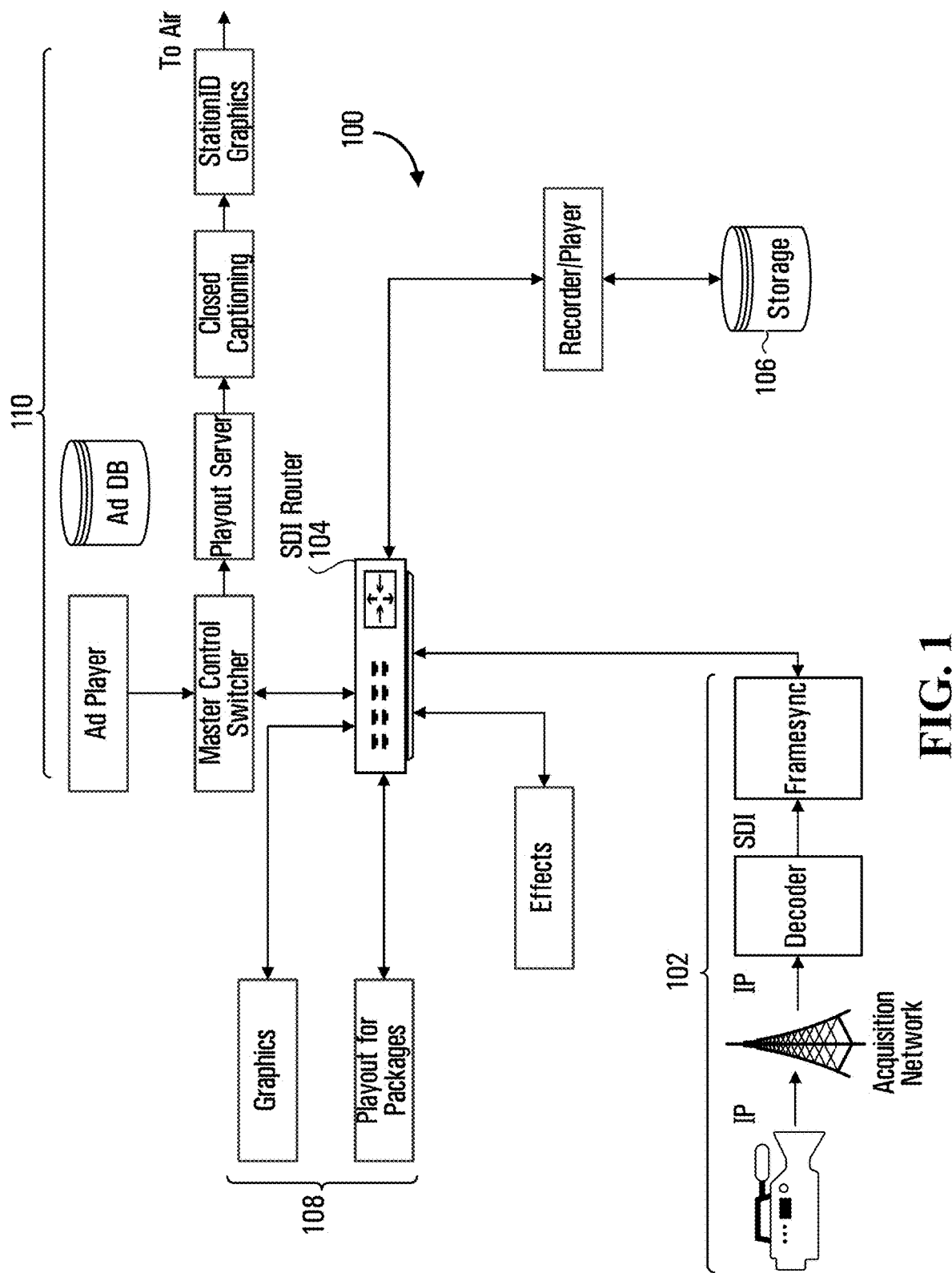
FIG. 1 is an example schematic diagram of an existing system for video through a television control room or studio, according to some embodiments.

Some solutions generally involve transferring the audio and video data between processing units by way of coaxial cables via the Serial Digital Interface (SDI) routed through a specialized SDI router.

As multiple audio/video streams may need to be processed by a control room simultaneously, a large capacity (and expensive) SDI router is needed to provide guaranteed capacity. Further, the limitations of SDI cable lengths and options for locating and managing the various processing units are additional complicating factors.

With a shift to IP-based workflows in video production work, attempts have been made to allow for the encoding, transmission and reception of SDI signals within a control room, by encapsulating the SDI signals, generally uncompressed, through the studio over IP networks. Contributions to such solutions include the Society of Motion Picture & Television Engineers (SMPTE)™ creation of the SMPTE 2022 and 2059 protocols, and NewTek's™ Network Device Interface (NDI). However, such solutions are generally designed to work within a local area network (LAN) within the television station or studio, rather than a wide area network (WAN), where the various processing might be conducted remotely via the cloud.

IP-based workflows represent one type of networked workflows for media processing, and other embodiments and technologies may be utilized.

As described in some embodiments, remote processing solutions may be harnessed to provide processing benefits that would not otherwise be available or applicable in the context of a local processing solution.

Such remote processing may be considered in the "cloud", where the cloud includes a set of distributed resources that are interconnected through the use of data communication streams established directly and/or indirectly between resources. The resources may be real or virtual computing devices that can be commissioned whenever necessary for use, for example, such as resources that are provided in the form of a "pool" of computing resources, including processors, computer-readable media, storage, networking equipment, etc.

Virtual instances may be provided on the same or different computing devices, for example, a single server may be configured to host multiple instances, or a single instance may be provided by multiple computing systems working together.

As described in various embodiments, there are potential advantages whereby computerized coordination of the pool of computing resources aids in orchestrating processing across the distributed resources, enabling, in some instances, a reduction in overall computing power required, an overall cost (e.g., using off-peak computing resources), a reduction in processing/routing time (e.g., by selecting resources that have lower latencies in relation to a final destination), among others.

In some embodiments, the resources (e.g., computing, networking) may be dynamically provisioned, and there may be characteristics associated with the resources that may be utilized to obtain further processing benefits that would not otherwise be available in the context of the local processing solution. For example, the resources may be dynamically provisioned and/or de-provisioned when needed (e.g., allowing for the use of a common pool of resources to be efficiently shared, taking advantage of otherwise wasted excess capacity), the resources may have geographic location considerations, and the resources may also have different network communication stream characteristics from one another. Stream characteristics include, for example, bandwidth, latency, congestion, availability, cost, among others. Resources may have prioritization aspects that may be controlled, for example, modifying queues of instructions, access, etc.

An example scenario that may arise is when resources are dedicated to a particular station based on "peak times" (e.g. local evening newscast). Additional resources may be used based on time of day, with resources being de-provisioned for that user/station at the end of that cycle, only to be reused by another station in the "following" time zone. Accordingly, a dynamically provisioned set of resources may be advantageously utilized across time-zones such that rotating "peak times" are used to determine how limited resources can be shared to meet demand.

In some scenarios, some time zones may have fewer stations that others, in which case the overall pool of active resources would grow and shrink between the time zones. Accordingly, these situations, there may be different configurations, one in which a given station grows/shrinks its own resource pool throughout the day according to expected use, and one in which the entire resource pool can grow or shrink over the day depending on expected use within a time slot (e.g., as the groups of stations expected to require the resource grows and shrinks during the day). Load may not always be predictable, for example, a spike in resource requirement in late evening news broadcast in England might coincide with a supper-hour broadcast in New York which might coincide with a breaking news event in Tokyo, when the New York broadcast has more news than usual at that hour (since the fact that it is coincident with the London evening news broadcast may be predictable), and the breaking news in Tokyo may lead to uneven and unpredictable availability.

The geospatial nature of the physical resources supporting the dynamic resources may be of importance, as the location upon which is the cloud resource located may be a relevant factor in determining which resources to utilize. As time progresses, resources located in differing time zones may be "rolled", to reflect the requirements of stations in the time zones. Alternatively, in some embodiments, at peak times, there may be multiple geographies where resources are spun up, and at trough times, for resources/actions for which network latency is not a constraint, the system may be configured to only use (or to emphasize use of) resources in a particular location (e.g., a location with the lowest electricity or personnel cost, for example all editing or other activities requiring human intervention are sent to India during trough times, with resources in traditionally more expensive geographies such as New York only being engaged at peak times). In other embodiments, there may be rules by which certain activities need to be performed by certain individuals (e.g., unionized station staff, individuals with a particular security clearance), which may further restrict which resources are to be utilized.

In some embodiments, a controller (e.g., processing orchestration controller) is utilized that tracks and/or monitors peak time usage and capacity of one or more computing devices, for example, by maintaining a data structure storing records of usage and/or schedules of expected/reserved usage. A rolling average or other metric may be maintained to establish an expected utilization rate. Resources having lower expected utilization rates during a period of time may, for example, be good candidates for load balancing across distributed resources.

Geospatial distances may not always equate with a "communications distance" between resources, for example, there may be a fast and high-bandwidth connection between two distant geographical locations, while conversely, for two close geographical locations, due to poor connectivity, they may seem "further away" from a communications perspective. This distinction may be, for example, taken into consideration when determining which resources to utilize.

In some embodiments, latencies, available bandwidth, and/or packet transmission characteristics are measured and monitored over a period of time so that predictions and decisions may be made based on past characteristics (e.g., low variability latency statistics or latency below a predetermined threshold). Communications predictability and reliability are considerations when selecting distributed resources for utilization as in some situations, unexpected latency and/or poor communications streams may impact downstream dependent processes.

A selection process may be utilized to determine specific virtualized resources that are optimally suited (or at least better suited relative to status quo) for a particular application, and the selection process may include not only performance factors, but also cost factors, redundancy factors, etc. In some embodiments, a controller is utilized to conduct a preliminary determination to identify resources that are more efficient for a particular context or situation (e.g., a resource with strong graphics capabilities may be better suited for complex, graphics intensive tasks, while a resource with a large cache may be better suited for tasks involving a large number of storage read/writes). The controller may utilize the preliminary determination to establish expected or temporary assignments, which may then be updated or revisited as more information becomes available about expected selection factors (e.g., resource A is selected on a preliminary determination, but as the time for use approaches, resource A is suddenly under heavy load and resource B becomes a better target).

For example, the geographic location and/or communication stream between particular resources may be selected based on a number of factors, such as cost, latency, processing time, etc. These resources may be selected, for example, based on weighting approaches and methodologies that can be used to allocate resources based, for example, on functionality, known required processing time, known required maximum latency times, etc. Resources are not limited to processing, but may also include the communications network, the editing, storage and related resources, or any combination thereof.

These considerations may be known a priori in relation to some usages (e.g., as fixed or a historical average), such as the amount of time required to add subtitles or a scoreboard onto a video stream, or the known delay time between event occurrence and broadcasting (e.g., for providing an opportunity for censorship of expletives). In some embodiments, considerations are dynamically adjusted for as they are sensed and/or monitored. For example, there may be changing cost considerations, network conditions, redundancy considerations, resource supply, resource demand, load balancing requirements, etc.

In some embodiments, resources are managed centrally by a main controller, which may be interoperating between multiple sources and/or destinations, for completely separate streams and requirements. For example, the main controller may be interoperating as a broker of cloud-based resources for a news transmission, a closed circuit system, and a sports transmission simultaneously, while balancing media content processing resources. The balancing may be optimized to provide an outcome that is beneficial for the overall provisioning of the system, not just for a single use. In some embodiments, various uses may be prioritized over others with priorities changing dynamically due to changing rules for a set of transmissions, or by the inclusion of new transmissions and completion of existing transmissions.

As the system obtains further information about the requirements of the streams, it can better support automated and/or semi-automated decision-making. Where there are live and/or real-time transmissions that have a fixed deadline, resources may need to be dedicated so that the deadline is always met.

Conversely, an offline edit and re-encode of a clip may have no hard deadline, so the controller could decide to time slice that task with others that also have no deadline, in order to optimize overall cost (e.g. reducing the need to spin up more cloud resources for a task that can wait).

Depending on the types of edit and/or processing, and the imminence of deadlines, the system may issue control signals that introduce a delay (e.g., an artificial delay) where one was not present before to utilize distributed resources in processing/pre-processing a signal, the delay, for example, determined based on characteristics of the distributed resource, such as resource bandwidth, communication stream/connectivity characteristics, type of processing required, economic viability, etc. In some embodiments, an application driven SD WAN (Software Defined Wide Area Network) may be dynamically formed from the selected available cloud resources.

In some embodiments, the controller is configured to gauge the amount of processing resources available for a given task during one or more periods of time, and makes an initial determination as to the duration of the artificial delay. In a non-limiting example, it may be critical to ensure that censorship processes are able to filter out explicit language (e.g., the program is being broadcast live, pre-watershed of 9:00 PM), and the censorship processes consume a known quantity of processing resources. In this case, the controller of some embodiments is configured to dynamically establish and/or determine the duration of the artificial delay such that the censorship processes are able to occur. While ideally the size of the delay is as minimal as possible, in some instances, there may be cost or other constraints, and the controller can be configured to seek a balance based on a set of provided processing priorities. In some situations, the size of the delay may not be a particularly relevant consideration, and costs can be optimized (e.g., by using off-peak computing resources).

A "safety cushion" may be added to the determined delay between corresponding frames for processing, in the event that more time is required (e.g., it is expected that using resources A, B, and C, a delay of 3 s typically be sufficient, and the controller may add a cushion of 50% and insert a delay of 4.5 s to help ensure that the processing is complete). In some further embodiments, the system is configured to track and compare actual vs. expected processing times and the provided delay, and modify a safety cushion level over time based on modelled statistical standard deviations and variances. For example, a safety cushion, rather than a fixed factor, may be provided to ensure that the processing should be able to finish within the delay within 1, 2, or 3 standard deviations, etc., providing for a more granular approach to right-sizing a delay mechanism.

Communication streams may be provided over one or more links, for example, a communication link could host one or multiple communication streams. In some embodiments, the system is configured to provide single communication links to transmitters and multiple links to transmitters simultaneously, where multiple transmissions are being handled. In some embodiments, there is only one communication link per communication stream, and in other embodiments, each communication link has multiple communication streams. The separation of communication streams may be physical, or virtual, or a combination of both. For example, a communication link may be logically separated into multiple communication streams, etc. Communication links may be selectively chosen for use with specific data streams based on characteristics of the communication links (e.g., speed, bandwidth, packet loss, latency [historical or dynamic]).

In some embodiments where the communication streams are provided over a same link, contention may be managed, for example, by applying Quality of Service protocols that can be used to ensure that the low resolution stream arrives first and that sufficient delay is used to ensure adequate time for whatever operations need to be performed. The communication link or links may, in some embodiments, be selected by the system with information indicating the needed delay (e.g., send low quality editable preview on low latency cell, send the full on high latency satellite), and in some embodiments, the Quality of Service protocols do not need to rely on being on "a same link". An example of an approach to improving transmission performance may be found in application Ser. No. 14/360,372 (granted as U.S. Pat. No. 9,357,427), incorporated herein by reference.

Communication links can be between the controller and the computing devices (e.g., editor computing devices or routing computing devices), or in some cases, between computing devices themselves. Different topologies are possible, for example, in some topologies, the controller is connected to each computing device, but in other topologies, computing devices may be connected to one another in a parallel or serial manner (e.g., passing information between computing devices as "stages" of processing are complete). In an example, a first editor computing device that is dedicated for a first type of processing, which must occur prior to passing off to a second editor computing device that is dedicated for a second type of processing.

As provided in some embodiments, cloud-based solutions offer advantages in handling the video processing typically done inside of a television station, including, but not limited to, scalability, load balancing, flexibility, redundancy, parallelism, the ability to "pay for use", and to perform inter-station transfers of the video output. Additional computing processing power that would have been otherwise unavailable may, through the use of distributed resources, be economically viable. For example, a particularly intensive encoding/transcoding process may be viable through the use of distributed resources/resource sharing but would not have been viable if a processing unit had to be purchased and managed at a particular station/control-room.

Accordingly, more efficient uses are available, increasing the opportunity and ability to conduct edits or other processing to improve quality/add effects to data transmission streams with a limited amount of resources.

Video processing, especially transcoding/encoding operations, is very processor intensive, especially in relation to high-definition and/or high resolution formats, and accordingly, resources can be both expensive and scarce. Processing tasks may include, for example, scaling, signal translation/transformation, interlacing/de-interlacing, artifact removal, brightness/contrast adjustments, digital zooms and pans, color point conversions, noise/distortion reduction, motion compensation, compensation for motion prediction compression, compression, boundary effect compensation, among others.

Various technical problems may need to be overcome to achieve these advantages. For example, cloud-based solutions can create challenges in managing latency and synchronization of both machine clocks and human activities which may involve multiple resources at different locations. In some embodiments, computing resources and the controller are synchronized to a common clock mechanism, which provides accurate timestamping to processing operations. Further complicating factors may include the geographical location of the distributed resources, the quality of communication streams between distributed resources, error correction, etc. There may be increased complexity in resource management, especially where the data being transmitted through the communication streams is critical or exceptionally time sensitive.

In some embodiments, the system is configured to split tasks into smaller portions, and assign them to idle cloud resources for processing. Those resources on their own might have low computing capability, and thus go unused in a naïve system that assigns entire tasks to individual nodes. The challenge would be in designing a system that can take advantage of these bits of excess capacity, such that in aggregate they provide sufficient processing power to perform the required tasks. For example, the system may be configured to undertake distributed parallel processing of signals, optimally utilizing distributed (cloud) computing, storage and networking resources. Excess capability in one region or cluster of resources can be utilized in parallel processing, and a technical challenge arises in the coordination of such processing such that processing steps are able to be conducted in time and dependent processing steps are able to proceed.

In the context of video/media content processing, specific advantages may be available as these types of signals may have generally known processing requirements, and can be split up into multiple portions (e.g., audio, video, overlay, captioning, metadata) each having specific characteristics and requirements.

As there may be known acceptable and/or introduced delay levels for transmission (e.g., an enforced five second day so that a censorship organization can remove "swear words" from a live television broadcast), parallel processing can take advantages of these known and/or introduced delay levels (e.g., 5 second delay) for conducting post-processing (e.g., artifact removal, adding overlays, transforming processes) of signals that would be otherwise computationally unfeasible. Where resources are constrained, communication streams can be utilized to tap into excess capacity and/or provision additional capacity for processing. In some embodiments, potentially more processing heavy/alternative scenarios for censoring may be possible (e.g., for unintended nudity or violent content in a live broadcast, blurring out a victim or obscuring identity of an undercover officer/soldier etc.). As indicated in these examples, it is not always possible to identify potential requirements for processing (censorship) ahead of a need. Accordingly, a processing delay as described in some embodiments is helpful as it allows time for allocated computing resources to conduct automated identification (e.g., via a neural network or an individual tasked with identifying censorship requirements) and/or censorship during the opportunity afforded during a delay duration (e.g., the censorship may be processor intensive, for example, requiring pixelization, modifications/filters/effects to be applied).

A potential factor in determining load usage for distributed and/or dynamically provisioned resources is the addition of real-time constraints/deadlines to the work. When splitting the work between the available nodes, the work must be assigned in such a way that the completion time will still meet the deadline.

In an embodiment, a system is provided that may be utilized for pre-shot selection/switching (e.g., where the "low quality preview" methods are provided, low quality preview being described in additional detail further in the specification). Pre-shot selection/switching may be provided using a first set of virtualized components, and post-shot processing may be provided using a second set of virtualized components. Depending on the amount of time required and the level of content quality required in each content stream required for pre-shot selection/switching and post-shot processing, latency and/or bandwidth constraints may be advantageously utilized to simultaneously provide editing decisions at a pre-shot selection/switching side for the encapsulation of instruction sets that are then applied to post-shot processing.

Parallel processing of post-shot selection processing through the use of low-quality video, audio, and/or metadata may be utilized to reduce latency while maintaining quality, using an editor/processor that may be "in the cloud". In some embodiments, one or both of the pre-shot editing and post-shot processing may be conducted "in the cloud".

In this example, a set of faster arriving low-quality stream components being edited and processed by full processing/editing tools may provide compressed instruction sets that may be provided back to a processor which would manipulate the high quality stream as it (later) passed through the router, eliminating traffic and latency between the router and other cloud editing tools (by not having the full rate video going from unit to unit).

Accordingly, limited resources may be more efficiently utilized, and through computational mechanisms, latency/data transmission time can be utilized to conduct editing and processing of data. The virtualized components may also be utilized for other features, such as buffering or otherwise managing the delivery of the stream to comply with a set programming schedule for a given station or stations. For example, such a system may be beneficial where latencies (e.g., as provided by network constraints), delays (e.g., to provide enough time for censorship), requirements, and/or network congestion patterns (e.g., during prime-time or peak times) are known. These built-in delays provide opportunities for parallelization (e.g., pipelining) using distributed computing resources.

Applicant has also filed several applications in relation to media data processing, including U.S. patent application Ser. Nos. 14/329,112 and 15/095,002. These applications are incorporated herein by reference.

In some embodiments latency may be a pre-set value, in which the various processing activities, for example, video editing, sound editing, adding of overlays to the picture etc., must be carried out in that pre-set amount of time.

In some embodiments, latency may be a calculated value, using variables such as the measured or estimated latency of transmission time from source to cloud, measured or estimated latency of transmission time between cloud or station based processing engines and the smart router, or the estimated time needed for processing the video (by machine or human), or any combination of these or other factors.

In some embodiments, the low quality preview stream could be video only (in some other embodiments, audio only). In another embodiment, the low quality preview stream may involve multiple streams of different kinds, such as audio, GPS co-ordinates, metadata about the shot (time-stamps, text providing context of the shot, such as information about an interviewee) etc.

In some embodiments, the processing and editing includes at least one of adding subtitles (e.g., for closed captioning, explanations, multi-language support), adding graphical scoreboards (e.g., for sports games, political convention statistics), adding graphical icons (e.g., logos, channel designations, branding elements), adding advertisements (e.g., banners, advertising content), adding overlays (e.g., split screens, masks), and censoring (e.g., "bleeping" out words, "mosaicking" appendages). Identifying areas (e.g., coordinates, regions of interest) for placement, is particularly computationally intensive where it is not known a priori where the best location is, and the best locations need to be identified on an on-demand basis (e.g., drawing a first down line on the screen for American football).

Image/object/voice recognition (usually used in the context of security/surveillance) is an example of a computationally complex processing function. The solution might make these processes more efficient by sending a low quality preview to a coarse-grained object recognition node, which can then return hints about selected regions of interest (either temporally or spatially, e.g., the first down line should be around X1,Y1-X2,Y2 coordinates). High quality versions of those regions could then be sent to other processing units for more detailed analysis/recognition, which may result in reduced data transmission needs and costs. Image recognition can be used, for example, to identify or probabilistically estimate product placement by competitor products, nudity, etc., for removal from a final output stream.

Some of the processing and editing may require computationally intensive modifications to the source stream, for example, some of the processing and editing may include transformations of data and/or the application of filters. For example, a "difference of Gaussians" approach may be used for edge detection, the picture may be saturated/de-saturated, noise added/removed, features sharpened/enhanced, etc. There may also be processing and editing relating to transcoding, re-encoding, up converting, down converting, depending on a particular desired output signal.

Accordingly, as described in some embodiments, a portion or all of the processing and editing features in relation to streams that are processed using distributed resources may be advantageously performed using techniques and approaches that more efficiently take advantage of the nature of distributed resources, and system/network latencies, improving the functioning of an electronic content processing system.

For example, a cloud editor may request insertion of one or more intra-coded picture frames (I-frames) into an infinite GOP (group of pictures) stream with either a certain cadence or specific list of I-frames to suit (e.g., best suit, or suit based on an optimization) a prevailing condition. In some embodiments, the insertion is directed by a human editor, and in other embodiments, an automated approach by the application itself is utilized (e.g., attempting to sync the editor and the transmitter). The I-frames or other types of control frames can be used, for example, to ensure proper synchronization between various components of the system, and in some embodiments, are useful to ensure that the system is able to track the difference in time shift between corresponding frames of the source video stream as between the preview stream and the pre-processed stream.

The insertion can occur with respect to either the preview stream, or the pre-processed stream (e.g., please send pre-processed on the full stream at times x, y and z, since an editor wishes to edit in/out at those times). In an alternate example, the system may indicate, in the form of a control signal, "don't transmit I-frames between x and y, since the system does not desire the I-frames as the system is configured to save bandwidth or allow for better quality of the pre-processed portions that are desired).

FIG. 1 is an example schematic diagram of a system for video through a television control room or studio, according to some embodiments.

The system 100 may be provided as an in-house system for processing video, and may include, for example, a series of components for providing source signals 102, which are then routed to an internal SDI router 104, which is configured to save, store, or replay, information on storage 106.

Additional graphics and playout for packages 108 may interface with the SDI router 104, and the SDI router 104 may process the content and further process the source material obtained from 102 to prepare the signal for output through components 110. As provided components 110 may include, for example, the provisioning of advertisements, closed captioning, station graphics, among others.

Typically, this system may be provided in the form of an on-site data center with little latency between connections but also limited by the amount of computational resources available. Additionally, network bandwidth and storage may be limited. The components 108 and 110 are also limited by the amount of processing power of SDI router 104, and SDI router 104 is typically located in a fixed geographical region.

For example, if a type of processing is required within a specific timeframe (e.g., 1 second due to signal delay), SDI router 104 is limited by available resources in that it can only compute as much as possible under the 1 second timeframe before being forced to provide an output through components 110.

Figure 2A:
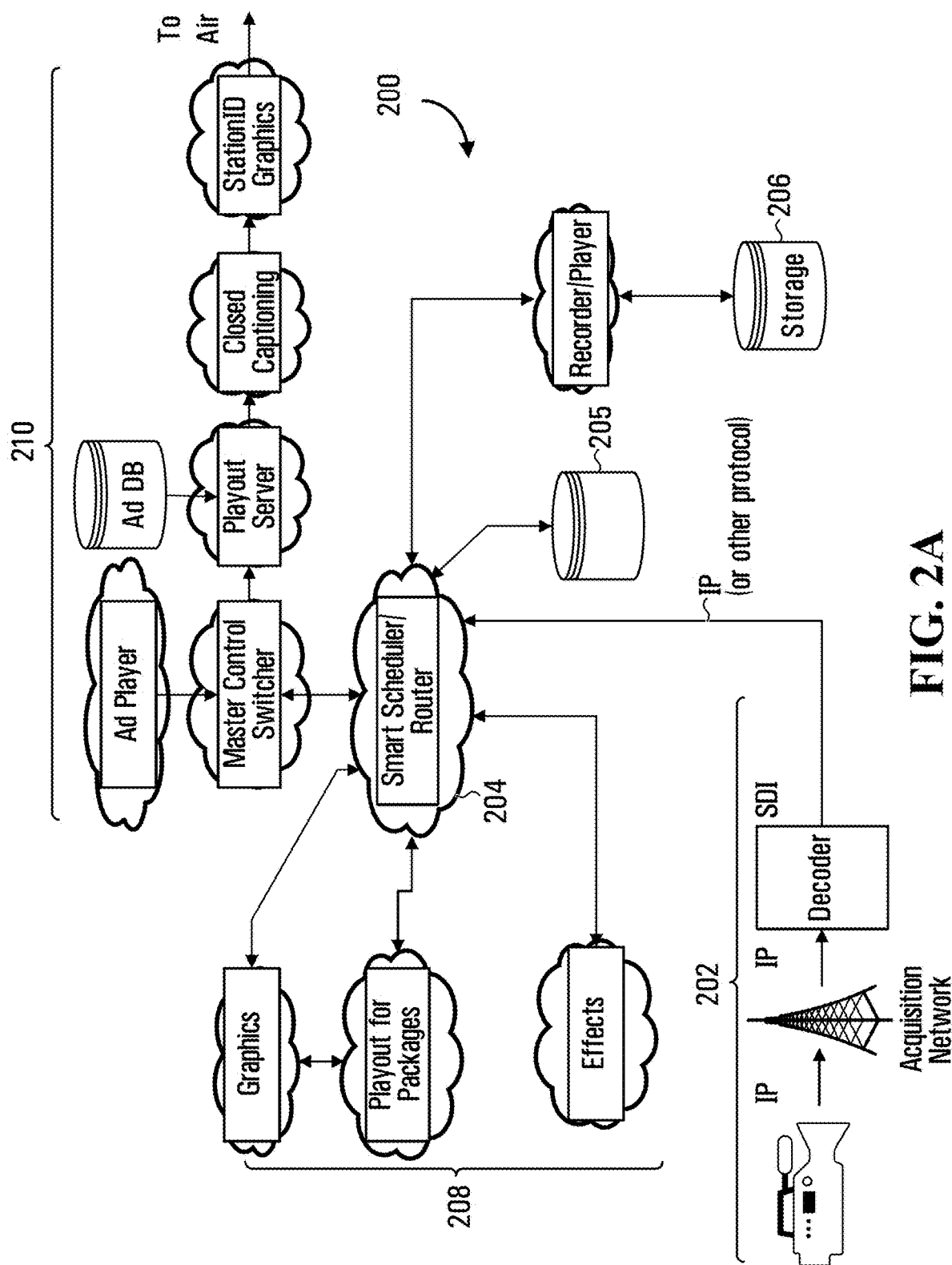
FIG. 2A is an example schematic diagram illustrating an alternate system for video or other data through a cloud-based mechanism for various processing activities, according to some embodiments.

FIG. 2A is an example schematic diagram illustrating an alternate system for video or other data through a cloud-based mechanism for various processing activities, according to some embodiments.

The alternate, distributed resource mechanism may provide significant improvements over the implementation of FIG. 1, including, for example, the ability to assign and otherwise provision tasks among different computing resources having a diversity of functional characteristics, geospatial characteristics, and/or networking characteristics.

Resources may be selectively "spun up" or "spun down" (e.g., assigned, provisioned, booted, reserved), and in some cases, may be reserved, provided on a "spot" basis or provided on an "on demand" basis, having different costs and availability factors. Rather than using a fixed set of resources, on-demand resources can be intelligently assigned to perform various tasks associated with at least one of the preview data stream and the pre-processed data stream such that time-shifting and time-constraints can advantageously be used for reducing or managing an overall processing time/cost required.

System 200 is depicted as a distributed-resource based implementation where each of the components depicted in the form of "clouds" is provided as a distributed set of networked computing devices. There may be a series of components for providing source signals 202, a smart-scheduler/router 204 which stores data on storage 206, graphics/playout for packages, and effects components 208, and signal processing components 210. The signal processing components 210 may include, for example, a master control switcher, an ad player (which may be operatively connected to an advertisement database), a playout server, a closed captioning processor, and a station graphics engine. Other components 210 are possible, and the above are provided as examples. Database 205 may be provided to store records, for example, that are used to track and/or predict latencies between cloud and processing units (or between processing units). Other types of data storage (e.g., relational database, non-relational database, flat files, linked lists) are possible, and database 205 is shown as an example.

The specific computing components underlying system 200 may, for example, be computing resources that are provided in the form of a pool of available resources, load balanced across multiple users and/or uses, and/or locations. These available resources, for example, may be shared "in the cloud" with tasks that are distinct from video/media processing, such as processors being used for web hosting, cryptocurrency mining, data centres, bioinformatics processing, etc.

There are communication streams established between components of system 200, and depending on the geography of the underlying computing components, there may, relative to the system 100, differences in network/system characteristics (e.g., latencies, bandwidth and propagation times), especially where the distributed resources that are being used span geographical distances and regions. By blending networks in this way, the system 200 is configured to provide application aware networking. For example, a controller may be configured for raising or reducing priority levels associated with various content streams, based on their importance and criticality to an underlying processing task or objective.

More expensive networking links may be reserved for these purposes, etc., and in some embodiments, the system 200 is designed to leverage more expensive but higher throughput/lower latency networking links such that identification/overall processing can conducted within a specific timeframe (e.g., within a time constraint), despite unexpected processing issues that increased processing time (e.g., more expensive links are utilized as a compensation mechanism).

Figure 2B:
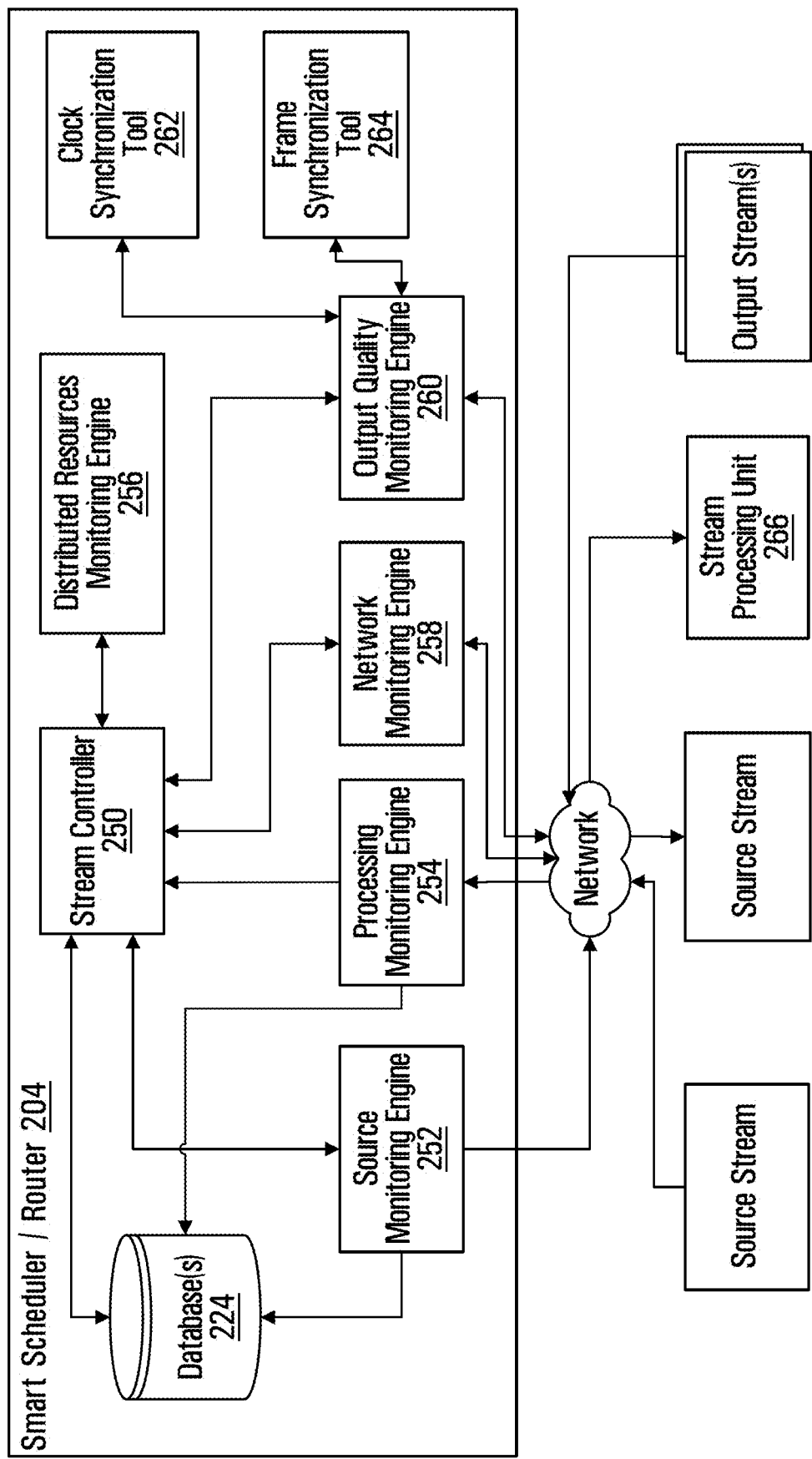
FIG. 2B is an example block schematic diagram illustrating components of the smart-scheduler/router, according to some embodiments.

FIG. 2B is an example block schematic diagram illustrating components of the smart-scheduler/router 204, according to some embodiments.

As depicted, smart-scheduler/router 204 may have stream controller 250, which is a computing device configured for managing the flow of data from various streams such that various objectives are met. The stream controller 250 may control streams received from a video source, or modify how a preview stream and/or a pre-processed stream are generated.

In some embodiments, the stream controller 250 includes a feedback pathway that sends control signals that modifying encoding of the preview stream and/or the pre-processed stream, such that a relative time shift in corresponding frames of the preview stream and/or the pre-processed stream can be established. In some cases, a fixed time-shift (e.g., corresponding frames are 5 seconds apart) is maintained, and in other cases, a variance in time-shift is allowed. The stream controller 250 provides timestamps to streams, and in some embodiments, inserts key-frames or other timing features into the frames so that corresponding frames of the preview stream and/or the pre-processed stream can be identified.

Maintaining consistent timing can be particularly important as a loss in coordination may be far reaching effects on system performance (e.g., coordination of cloud resources, and reservations thereof may become misaligned).

The stream controller 250 may interoperate with source characteristic monitoring engine 252, processing requirements characteristic monitoring engine 254, distributed resources monitoring engine 256, network characteristic monitoring engine 258, output quality monitoring engine 260, clock synchronization tool 262, and frame synchronization tool 264.

These objectives may be provided in the form of triggers, conditions, logical rules, etc., and translated into instruction sets that allow the stream controller 250 to quickly triage and process monitored signal conditions as received from one or more of the source characteristic monitoring engine 252, processing requirements characteristic monitoring engine 254, distributed resources monitoring engine 256, network characteristic monitoring engine 258, and output quality monitoring engine 260.

Source characteristic monitoring engine 252 is configured to track characteristics of source signals, including, for example, bitrates, acceptable amount of delay (if any), type of content, processing required, etc. Processing requirements characteristic monitoring engine 254 may be configured to track required processing and parse the requirements into requests for distributed processing.

Processing requirements are not limited to processing of a pre-processed stream, but also processing required for identification tasks at a controlling device (e.g., identifying regions of interest, generating instruction sets for downstream processing of the pre-processed stream).

Distributed resources monitoring engine 256 track the current status of distributed resources, including whether the resources are available for processing, their scheduled workload, their geospatial distance, their "virtual" distance, whether the resources need additional provisioning/de-provisioning time, etc.

The network characteristic monitoring engine 258 is configured for monitoring latencies, packet loss, quality of service, available bandwidth, etc., related to various communication streams and/or links, and output quality monitoring engine 260 may be configured for tracking the processed outputs to determine whether outputs meet processing criteria, including whether the output was able to be provided within the specified duration.

Accordingly, the source signals 202 may be provided from transmitters that provide at least two data streams for communication with the smart scheduler/router 204 that may be configured for remotely processing data streams (or routing thereof). There may be one or more transmitters, and each transmitter provides a data signal comprising audio and/or video data. The transmitters, in some embodiments, include encoders that generate data streams from a single content stream (e.g., from a video source). The video source, for example, may be a live transmission from a news site, a sporting event, etc., and may be captured at the video source at a particular resolution and bitrate.

However, the video data may require compression/other types of processing and transformation as sending full rate, raw data from the video source may be unfeasible due to limitations in available bandwidth, or transmission throughput, among others. In some embodiments, the transmitters include one or more encoders, such as two encoders operating in parallel that generates multiple streams from the same source, the multiple streams having different characteristics (e.g., a first "preview" stream having a greatly reduced bitrate, and a second "full rate"/broadcast-quality pre-processed stream having a higher bitrate). The different streams may be encoded/transcoded using different protocols and/or transport containers (e.g., the preview stream is a stream of staggered jpg images, while the pre-processed stream is a generated mp4 stream compressed using a motion compression/prediction codec).

The different streams may have different output times due to processing required for encoding, and the different output times may be a natural source of delay as between the two streams. In other embodiments, an additional delay is injected or otherwise added between the streams to further add temporal spacing between the streams. This delay time, as described in various embodiments, may allow for additional processing and/or edits to occur, for example, by an editor or an automated editing device viewing the preview stream and sending instructions or otherwise causing effects to occur on the full rate streaming prior to providing to end points. For example, various visual effects may be added, undesirable elements may be removed, words or other information may be redacted or censored, among others.

In some embodiments, a scalable encoder is utilized for at least one of the streams such that the delay duration can be managed by modifying (e.g., scaling) encoding parameters. For example, the scalable encoder can be configured to provide coding delays proportional to resolutions of the at least two data streams (e.g., generating a 480p and a 1080p stream cause the streams to have different timing). In such an example, even artificially added delay duration can be used to obtain beneficial encoding outcomes as more time is available for processing at the transmitter.

While two or more streams are generated simultaneously by the transmitter, the difference in encoding time and/or implementation of any other delay mechanism (e.g., a buffer) may establish a delay between the relative timing of frames generated within each of the two or more streams. In some embodiments, the transmitter and/or the encoders are configured to timestamp and/or otherwise add metadata identifiers (e.g., header information) to the streams and/or their frames such that a downstream computing device is capable of receiving the streams and determining the amount of delay between the streams and/or the current frame sequence of each stream. As described in various embodiments, the relative timing and frame synchronization may be important in ensuring coordinated processing by downstream processing and/or routing components. In some embodiments, metadata and/or other synchronization information is provided in a separate metadata stream from the transmitter and/or encoders, the metadata stream, for example, aiding in timestamping, coordination, and indicative of other information, such as encoding type, codecs used, time constraints, etc.

In some embodiments, the transmitter includes one or more routing components that are utilized to control the transmission of data streams to downstream components, and the routing components, for example, are configured to modify networking parameters to, for example, prioritize, de-prioritize, introduce latency, reduce latency, increase throughput, etc., of one or more communication links for the transmission of the data streams. Accordingly, a relative delay between individual streams may also be introduced from the transmitter via the routing networking components of the transmitter.

The smart-scheduler/router 204 may then identify desired transmission characteristics and generate control signals (e.g., processing start time, desired processing end time, amount of resources to be consumed) to manage various computing devices to perform processing, editing, etc. in accordance with known constraints (e.g., time thresholds, available resources), and monitored characteristics (e.g., network congestion in relation to connections between computing devices).

In some embodiments, the smart-scheduler/router 204 is configured to manage traffic flow of incoming streams, including, for example, sending instruction signals to the stream sources (e.g., to indicate which stream should be selected, modification of source stream characteristics, routing to different computing resources), etc. Accordingly, the smart-scheduler/router 204 is configured for controlling edge nodes, scheduling, encapsulating, and transforming information for routing to downstream computing components. Where distributed resources are utilized, smart-scheduler/router 204 may be configured to define all distributed resources simply as nodes having various performance and/or other characteristics that are available for assignment or reservation for various computing tasks.

Prioritization may be established between different networking components to help ensure delivery of content and/or processing of content within an established delay period.

The smart-scheduler/router 204 may include a scheduler device that utilizes a buffer that is configured to play out video based on the airtime programming schedule at the physical or virtual station. The smart-scheduler/router 204 tracks actual and expected delays, and in some embodiments, includes local storage for monitoring performance and delay durations across a period of time. Pattern recognition methods may be utilized to continuously or periodically provide a control feedback loop mechanism to help expected and actual delays to track closer to one another. For example, a P, PI, a PID, or other types of control feedback topologies may be utilized in conjunction with reducing an error value associated with an artificial delay inserted for the purposes of providing additional time for performing video processing effects.

Further, the smart-scheduler/router 204 may also be configured to generate control signals that activate and/or deactivate, provision and/or de-provision, configure and/or re-configure various computing devices. For example, devices may need time to be "spun up" or "spun down" (e.g., hard disk drives need a period of time before being operational) prior to usage, and the smart-scheduler/router 204 of some embodiments is able to orchestrate activities of these computing devices by controlling them to be ready when processing is required. Ensuring proper initialization of devices prior to usage helps reduce the chance of processing requiring more time than allotted by the introduced delay mechanism.

For example, the stream controller 250 may be configured to determine and/or identify an optimal or superior set of resources from the available resources (as not all available resources are equal) for a particular need. The routing may, for example, be based on the application of various source and destination business rules (e.g., certain sources need to be encrypted, certain processing units are available for a fee etc.), among others. A path optimization tool may be applied to, for example, receive information and use the information to plot the route of both the stream elements and the final picture.

In some embodiments, the smart-scheduler/router 204 is adapted to manage at least two different data streams that may take different pathways in the course of processing and editing.

A decoder (or transcoder) unit may be provided that receives the various preview streams and de-bonds them (where the incoming source is bonded) or re-encodes them into a different format (or formats) depending on what the processing units or destination requires. Bonding and de-bonding of streams is described in U.S. patent application Ser. No. 12/499,151 (including U.S. Pat. No. 8,873,560) and U.S. patent application Ser. No. 14/341,057, each of which are incorporated herein by reference.

The database 205 may be utilized to store records or data structures, for example, that are used to track and/or predict latencies between cloud and processing units (or between processing units). For example, time-stamped or time-encoded data records may be maintained (e.g., start time, expected stop time, actual stop time, errors encountered). This data may be further processed to obtain performance metrics, such as identifiable patterns in processing functionality or network functionality (e.g., age of device, number of hours in service, network congestion during peak times), etc. in relation to the device.

The database 205 may, for example, be configured such that statistics (e.g., derived from latencies, including, for example, standard deviations, correlations, skew, distribution profile, variance) are collected and analyzed to make performance (and variance) based decisions about which connection or connections to send data on, or which editing devices to use or exclude.

For example, the database 205 may include records that are maintained to track "latency" within a unit (e.g., how much time does it take to process, either automatically or with human intervention (as in a 15 second clip may take 30 seconds for an editor to deal with before spitting it back out to the rest of the system, or it takes a closed caption system an extra 5 seconds between the words being spoke and the transcription occurring)). The database 205 of some embodiments includes tracking of network connections, and the ability to include, modify, or exclude network connections for communications. The ability to intelligently modify characteristics for communications, combined with an ability to select specific connections, provides an improved level of flexibility for the present control mechanisms to compensate or otherwise right size overall processing time.

For example, if processing is taking longer than expected (e.g., a video card unexpectedly failed due to overuse), the database 205 be utilized and traversed by smart-scheduler/router 204 to identify possibilities for time compensation, for example, by using faster (e.g., potentially more expensive) network connections, etc. for transferring of otherwise delayed instructions to a processing unit. Accordingly, in some embodiments, the smart-scheduler/router 204, responsive to a detected delay (e.g., generation of processing instructions on the preview stream will otherwise fall outside of a time constraint) may be configured to traverse the database 205 to identify one or more potential networking factors (or a combination thereof) that can be modified to compensate for the loss of time.

Time compensation mechanisms are useful in applications where there is criticality in ensuring that time constraints are met. For example, in some situations, time constraints are imposed due to downstream system dependencies.

The smart-scheduler/router 204 then generates an array of routing options, and selects one based on an optimized factor (e.g., lowest cost while providing an appropriate safety cushion), and then reschedules and reroutes (e.g., requests new networking resources) the signals so that the processing occurs within the time constraint. For example, higher priority lines may be re-allocated temporarily for use when an out of bounds timing value is otherwise expected.

A clock synchronization tool 262 may be provided to ensure that latencies can be properly tracked and measured between the various cloud processing units. A frame synchronization tool 264 may be provided to keep one or more frames (e.g., a final frame) in synchronization. A stream processing unit 266 ("a headless processing unit") may be configured to perform certain actions on one or more streams (e.g., the full-rate/broadcast-ready stream) based on instruction sets coming from the various processing units. The stream processing unit 266 is configured for expedient processing, and in some embodiments, is optimized for the receipt and implementation of low-level data instructions (e.g., low-level optimizations to improve memory usage, cause strength reduction replacements, identification of invariant code, restrict instruction sets only to a limited number of available instructions).

The processing unit, for example, may include an encoder that is utilized for final encoding to various destinations. In some embodiments, the multipoint encoder may be provided similar to those described in U.S. patent application Ser. No. 15/095,002. For example, the encoder may be providing the signals one to one to endpoints, but the transmission may also be provided in the form of tiered encoders, etc.

Figure 2C:
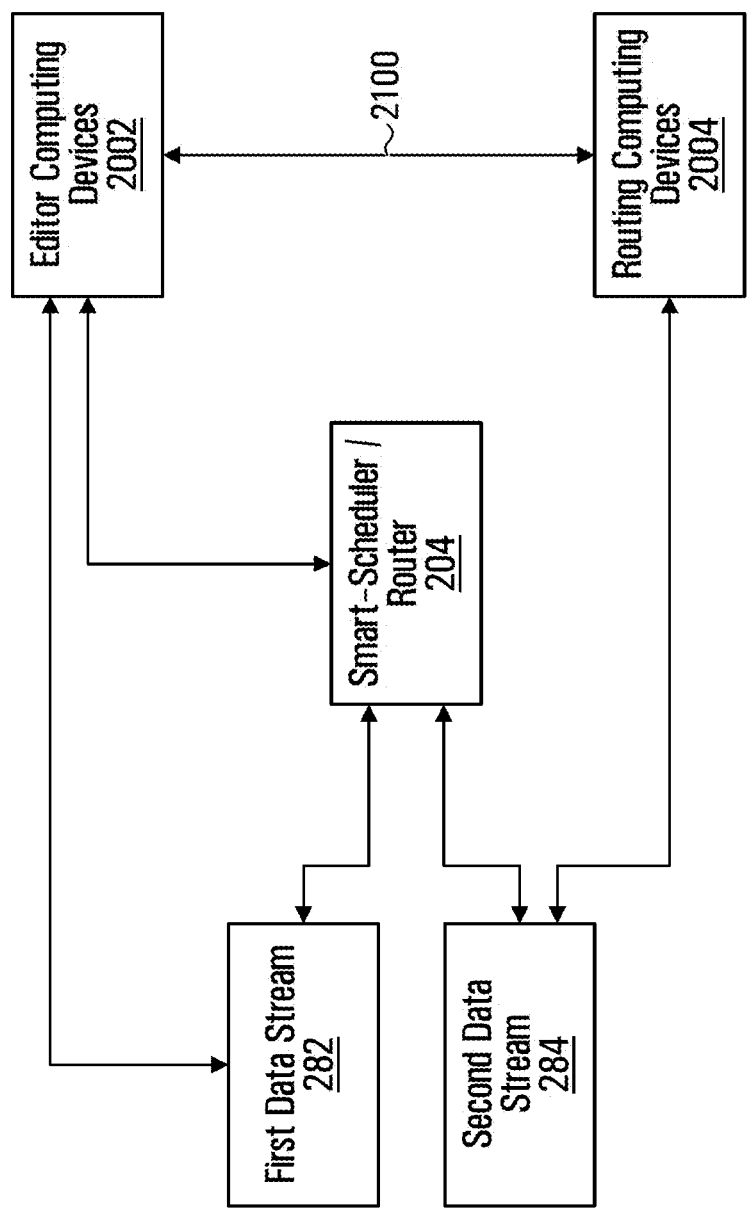
FIG. 2C is an illustration of the smart-scheduler/router interoperating with a first data stream and a second data stream, according to some embodiments.

FIG. 2C is an illustration of the smart-scheduler/router 204 interoperating with a first data stream 282 and a second data stream 284, according to some embodiments. In some embodiments, the first data stream 282 and the second data stream 284 represent bundles or sets of communication streams. For example, the at least two data streams 282 and 284 may include at least (1) a lower quality preview stream 282 and (2) a higher quality content stream 284.

A plurality of editor computing devices 2002 may be remotely located from the at least one transmitter, each editor computing device 2002 including at least a processor and non-transitory computer readable memory.

The plurality of editor computing devices 2002 are configured for receiving at least the lower quality preview stream 282, the plurality of editor computing devices 2002 configured for facilitating processing and editing on the lower quality preview stream, the processing and editing being used to generate a set of machine-readable instructions 2100 representative of the processing and editing.

The system may be configured to segment edit instructions into two main categories: Temporal and Spatial. A temporal edit command may, for example, comprise pairs of [start,stop] time offsets, indicating the offsets of the video to either cut or save. A spatial edit may, for example, comprise pairs in the form of [frame #,command], where command may be common image operations such as crop, resize, pad, blur, composite, overlay, etc.

As for sequential vs. parallel processing, parallel may potentially be more advantageous than sequential in the sense that it may reduce the editing latency to Max(EditLatency1, EditLatency2 . . . EditLatencyN) as opposed to EditLatency1+EditLatency2+ . . . EditLatencyN. As for using cloud resources, a potential advantage is the use of a more powerful resource (more powerful computer or software tools) in the cloud than in the control room, further reducing editing latency. Similar benefits may be accrued in the context of "TransmissionLatency1 . . . N", though there may be more complications, since the individual latencies may be (and likely will be) higher for each element than in a traditional control room (so the reduction in Transmission latency via parallelism may be overcome by the longer individual latencies and potentially by additional editing latency caused by having to reassemble the edits into a final picture at the end).

By sending a lower quality (and hence potentially lower latency) stream to the editor, the system may be able to reduce TransmissionLatency (or cost etc.) either directly (less data being sent possibly leading to less time needed to deal with errors), or by taking advantage of lower latency, lower capacity networks. For example, one might also choose a lower cost network, and not get the latency benefit. As a specific example, the system may be configured for using low latency/capacity cell for the lower quality preview, and high latency/capacity/reliability satellite for full video.

A plurality of routing computing devices 2004 are provided and remotely located from the at least one transmitter, each routing computing device including at least a processor and non-transitory computer readable memory.

The plurality of routing computing devices 2004 are configured for receiving at least the higher quality content stream 284 and the set of machine-readable instructions 2100, and the plurality of routing computing devices 2004 are configured for processing the higher quality content stream by encoding the higher quality content stream in accordance with the set of machine-readable instructions 2100 to generate an output content stream.

In some embodiments, a plurality of delivery management computing devices are provided, each of the delivery management computing devices configured for determining delivery characteristics to one or more endpoints and transmission of the output content stream to the one or more endpoints.

One or both the plurality of editor computing devices and the plurality of routing computing devices can be provided in the form of a data center in a cloud. The data center may be configured for receiving both the lower quality preview stream and the higher quality content stream and the data center including a router operable to route the received data streams between the plurality of editor computing devices and the plurality of routing computing devices.

In some embodiments, the set of processing instructions may be provided in the form of a metadata data stream. For example, the metadata data stream may be provided to the plurality of editor computing devices 2002 and processed in the generation of the set of machine-readable instructions 2100.

In some embodiments, the stream controller 250 may include a scheduler computing device, the scheduler computing device configured for monitoring transmission characteristics relating to arrival of the at least two data streams at the corresponding plurality of editor computing devices and the plurality of routing computing devices, and based on the monitored transmission characteristics, scheduling a transmission of data packets comprising the output content stream to at least one endpoint, for example, to communicate to the network monitoring engine to deliver a low latency blend of signals.

There may be cases where an edit must be completed to a specific timeline (e.g. a pre-planned broadcast, where certain time points must be hit in order to fit into the program (which may be using other content not generated/managed in the cloud, such as a studio shot of the news anchors reading their scripts). In those cases, the scheduler would be managing not only the elements of the incoming stream, to ensure that all the required/requested edits occur, but also be managing these to a hard deadline. Dependencies are tracked in the database 260 based on timestamps in the form of linkages, and where delays are encountered, dependency linkages may be traversed to modify and cascade instruction set changes across multiple computing devices based on a newly updated expected timeframe.

There will be other cases, (e.g., a live breaking news situation), where the programming schedule is fluid and deadlines a little less rigid (e.g. it may not matter if the wording on a particular text overlay about a live video are made "immediately", just that they are made "soon"), or content being edited for later broadcast where the deadline exists, but is considerably softer (and hence the scheduler might allow more time for editing tasks to be completed).

In some embodiments, the source signal 202 may be provided using a transmitter including a computing device configured for generation of the at least two data streams from a single content stream from a video source, and the lower quality preview stream 282 is provided in real or near-real time, and the higher quality content stream 284 is provided with a delay (which may be inherent in the encoding time of the stream or may be introduced by the system).

For example where a super-low quality stream (e.g., 100 kbps or 1 fps or some other element) is sufficient for a particular editing tool, whereas a "medium" quality stream (e.g., 1 mbps or 15 fps or some other element) is needed for something else. In some situations, the scheduler may be configured to generate instructions to send the minimum quality required by all of the editing tools (e.g., Max[min1, min2, min n]) and at other times it might choose to create additional preview streams (e.g., in a case where a tool with a high editing latency only requires a low quality preview, or in a case where the only cloud resource available at that particular moment requires a particular quality/latency in the preview stream.

In some embodiments, the scheduler may decide to limit the number of preview streams if, for instance, the transmitting device has limited computing capacity and is unable to create or transmit that many streams. In some embodiments, the approach may need to be conducted over bonded connections managed to reach latency targets.

There may multiple streams that contain completely different content (e.g. audio, video, metadata). In some scenarios, there are multiple audio preview streams, multiple video streams, etc., or any combination thereof (some send one stream only of the data type, others send multiple preview streams per data type). The number of previews might be also be limited by network capacity. The system may provide "edge node control", wherein the system controls the transmitter and provides instructions on what to do with respect to data, delay and frame rate etc. based on network and resource conditions, among others.

Figure 2D:
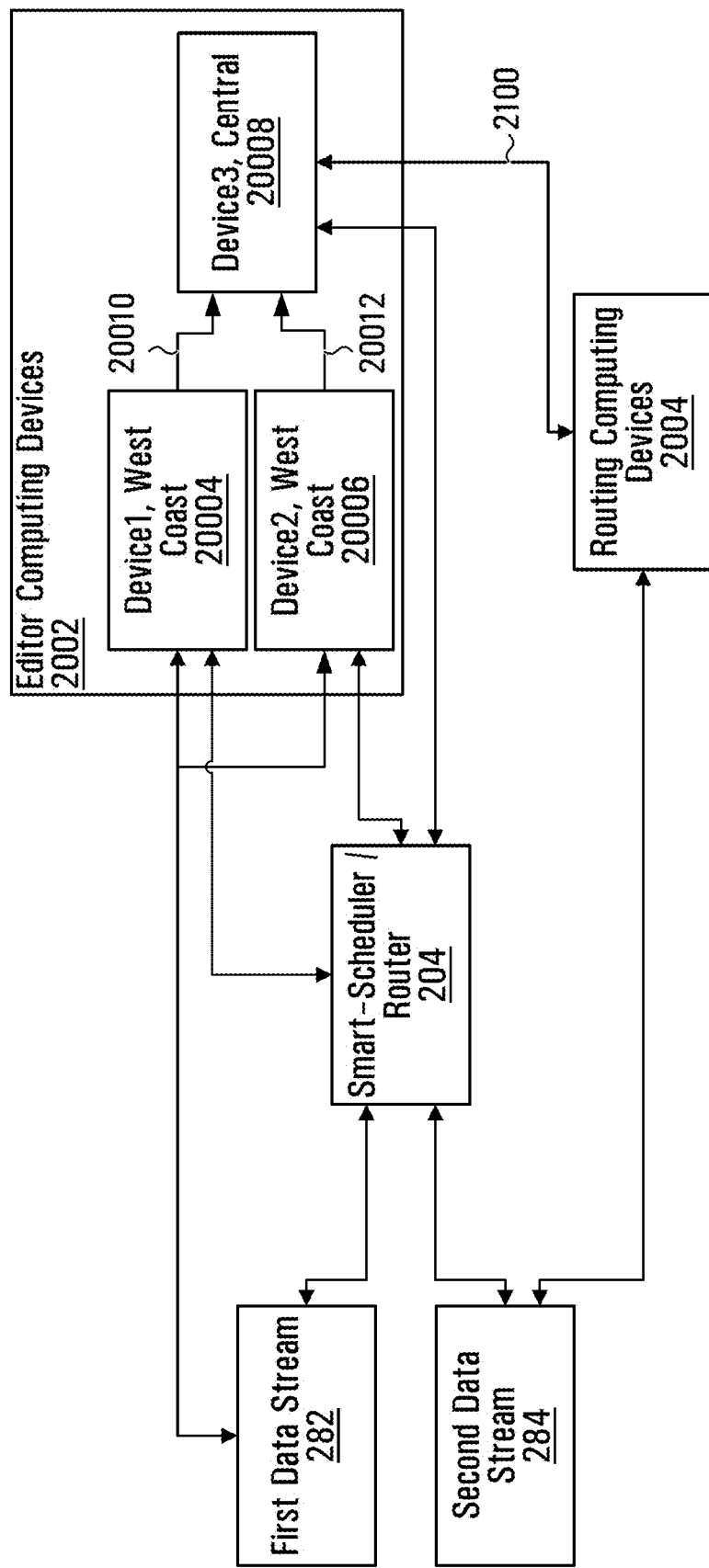
FIG. 2D is a block schematic diagram of a set of editor computing devices and routing computing devices orchestrated by a smart-scheduler/router, according to some embodiments.

FIG. 2D is a block schematic diagram of a set of editor computing devices 2002 and routing computing devices 2004 orchestrated by a smart-scheduler/router 204, according to some embodiments.

The editor computing devices 2002 may, for example, be controlling devices that generate sets of processing instructions that are performed by the routing computing devices 2004, which may perform audio/video processing steps on a broad-cast quality second data stream 284 prior to provisioning to endpoints (and ultimately consumers). The processing instructions may for example, indicate timeframes, areas or regions of interest for processing (e.g., drawing scoreboards, adding branding, providing annotations) when the routing computing devices 2004 are preparing the output data stream from the second data stream 284.

In some embodiments, the editor computing devices 2002 perform the computational "heavy lifting" in conducting high level identifications, for example, of processing that will be required by routing computing devices 2004. In a non-limiting example where the editor computing devices 2002 are tasked with the drawing of a first down line for a quasi-live American football game, the editor computing devices 2002 may include significant computing resources to automatically identify (e.g., by applying a neural network) a region in which a first down line should be drawn. The drawing of a first down line is technically challenging—in some cases, a 3-D model of a field is drawn (including its contours), the position of the football is identified, the perspective of the camera must be determined for tracking perspective effects, especially if the camera is moving, etc. The first down line also needs to not drawn over players, so the line must appear "under" various players.

The editor computing devices 2002 process this information using the preview stream 282, and generates an instruction set that is transmitted to the routing computing devices 2004. The instruction set is simplified, and simply includes a vector or array of instructions indicating parameters of modification—draw a yellow line of a particular thickness between coordinate points X1, Y1, and X2, Y2, in frames 5000-5544, the yellow line not drawn in specific other coordinate regions where players are covering or otherwise stepping on a line.

In the example of FIG. 2D, the first data stream 282 and the second data stream 284 have a delay duration X that is a combination of an inherent delay as a result of processing delays introduced in generating the higher quality pre-processing second data stream 284, and an introduced delay that is provided by a delay mechanism 20002. In some embodiments, the inherent delay can also be scaled by modification of characteristics of the higher quality second data stream 284, and the transmitter may receive control signals from the smart-scheduler/router 204 based on monitored availability of processing resources. For example, the generation of the higher quality second data stream 284 may be modified by way of selection of and implementation of different types of codecs, encapsulation/transport packages, protocols, compression, motion prediction, bitrates, resolution, headers, control frames, etc. The smart-scheduler/router 204 may track a delay (e.g., delay is Y due to pre-existing encoding choices), implement a processing delay (e.g., delay will be Y due to smart-scheduler/router 204's selected encoding choices), or fix a delay (e.g., delay is fixed to a predefined value, X, by varying a network delay or other delay Z along with an inherent delay Y).

Referring back to the American football yellow line example, the yellow line could be drawn faster than otherwise possible using the faster first data stream 282 in generating the instruction set while the second data stream 284 is being encoded. Accordingly, an output data stream could be prepared faster for consumption by a downstream football watching audience, with only minimal time required for adding the yellow line.

An additional delay may be introduced by either the transmitter or smart-scheduler/router 204 by way of selecting, or controlling the network connections between the second data stream 284 and routing computing devices 2004. For example, a slower, higher throughput connection may be selected, or a faster, lower throughput connection may be selected, or any other combination. Accordingly, a delay X can have various components, and the delay duration can be dynamically managed by smart-scheduler/router 204 in some embodiments.

The editor computing devices 2002 in this example have different geospatial, resource, and networking characteristics. The smart-scheduler/router 204 is configured to control data transfer to the editor computing devices 2002, including modifying characteristics of networking connections between smart-scheduler/router 204 and editor computing devices 2002. The smart-scheduler/router 204 is configured to track the available delay duration in conducting processing activities, and selects/provisions editor computing devices 2002 accordingly.

In this example, editor computing devices 2002 includes devices 20004, 20006, and 20008, each of which are located in time zones that are currently in off-peak. Where particularly challenging processing is required, a rolling set of resources may be utilized whereby the devices 20004, 20006, and 20008 "roll" through various time zones as different devices alternate through peak and off-peak availability. The first data stream 282 is provided to smart-scheduler/router 204, so that the delay duration between the first data stream 282 and the second data stream 284 can be utilized to conduct and/or cause one or more processing tasks.

The smart-scheduler/router 204 may be configured to track the required processing time at each step, as well as other factors, such as overall networking delay (e.g., time for travel along network connections 20010, 20012, 2100) for communications, among others. In this example, a particular order is introduced with the editor computing devices 2002, with devices 20004 operating in parallel with devices 20006 to conduct a first round of processing, which is then provided to devices 20008 for final processing. The devices 20008 encapsulate a package of processing instructions, which have been pre-processed by the editor computing devices 2002, representing various transformations (e.g., insertion, removal) and effects (e.g., shifting, color correction), and the package of processing instructions (e.g., is transmitted to the routing computing devices 2004 for processing of the second data stream 284 prior to providing a high quality data stream feed (e.g., a sports-broadcast having graphics appended, censoring algorithms applied) to various endpoint receivers (e.g., TV broadcasting station).

In some embodiments, the editor computing devices 2002 are further configured to provide a processed preview output to a preview endpoint (e.g., a studio truck) such that an editor is able to view the transformations and effects as superimposed or otherwise applied on the output of the first data stream 282. In some embodiments, editor computing devices provide the processed preview output to routing computing devices 2004 for coordination of processing (e.g., as an alternative to or in conjunction with sending instructions). In some embodiments, the system may be configured to provide, as an output to endpoints, the processed preview output from editor computing devices 2002.

The smart-scheduler/router 204 tracks the overall duration of delay, and selects and configures editor computing devices 2002 and networking pathways accordingly to ensure that the bounds of the delay envelope duration are not exceeded. In some embodiments, where a particular operation is taking longer than expected to complete, or a networking pathway is slow, the smart-scheduler/router 204 may be configured to compensate for the unexpected delay by, for example, either swapping editor computing devices 2002 being used for faster (and potentially more expensive) devices, or to request network communication resources that are faster (and potentially more expensive). Accordingly, in some embodiments, smart-scheduler/router 204 is configured for orchestrating an end-to-end computing solution whereby processing time and transmission times are managed and compensation mechanisms are utilized to establish a consistent or substantially consistent processing time such that routing computing devices 2004 are able to receive instructions within a sufficient period of time to implement processing effects prior to transmission to receiver endpoints. The smart-scheduler/router 204 of some embodiments is thus more able to compensate for variances from expected processing/networking transmission times that may occur as a result of, for example, failing hardware, poor time estimation, network congestion, among others. The smart-scheduler/router 204 modifies routing, pathways, order of processing, processing assignments, etc. in achieving compensation.

Figure 2E:
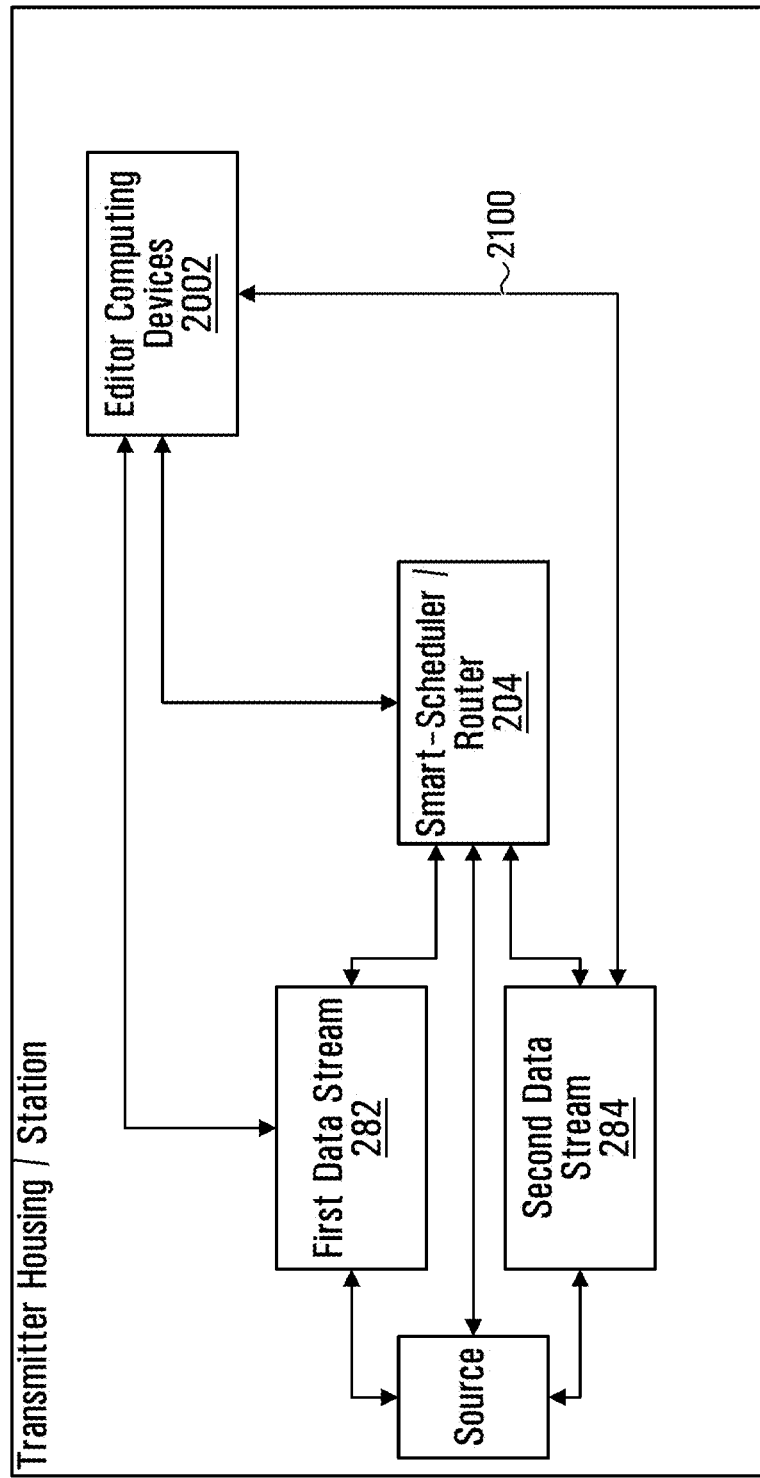
FIG. 2E is a block schematic diagram of the system, according to some embodiments.

FIG. 2E is a block schematic diagram of the system, according to some embodiments. In FIG. 2E, the editor computing devices 2002 are located in close proximity to the transmitter, and as an alternative to cloud resources, the smart-scheduler/router 204 controls a set of editor computing devices 2002. The devices may, in an example, operate in close proximity (e.g., in a same housing, or as a unit) with the transmitter. In this example, the transmitter generates two streams, one delayed relative to the other, and the delay between the two streams is utilized for generating processing instructions.

Rather than have a separate set of routing computing devices 2004, in an alternate embodiment, the processing instructions are transmitted back to an encoder of the second data stream 284 along network pathway 2100, which processes the instructions simultaneously while encoding second data stream 284. In an embodiment, the first data stream 282, instead of being a preview or low rate data stream, is simply the source data feed provided with no additional processing or encoding. This embodiment may be preferable where there are high-capacity connections to editor computing devices 2002, for example, if the devices are located in a same room or facility and connected using high throughput wired connections (e.g., Cat 6+ connections).

Figure 3:
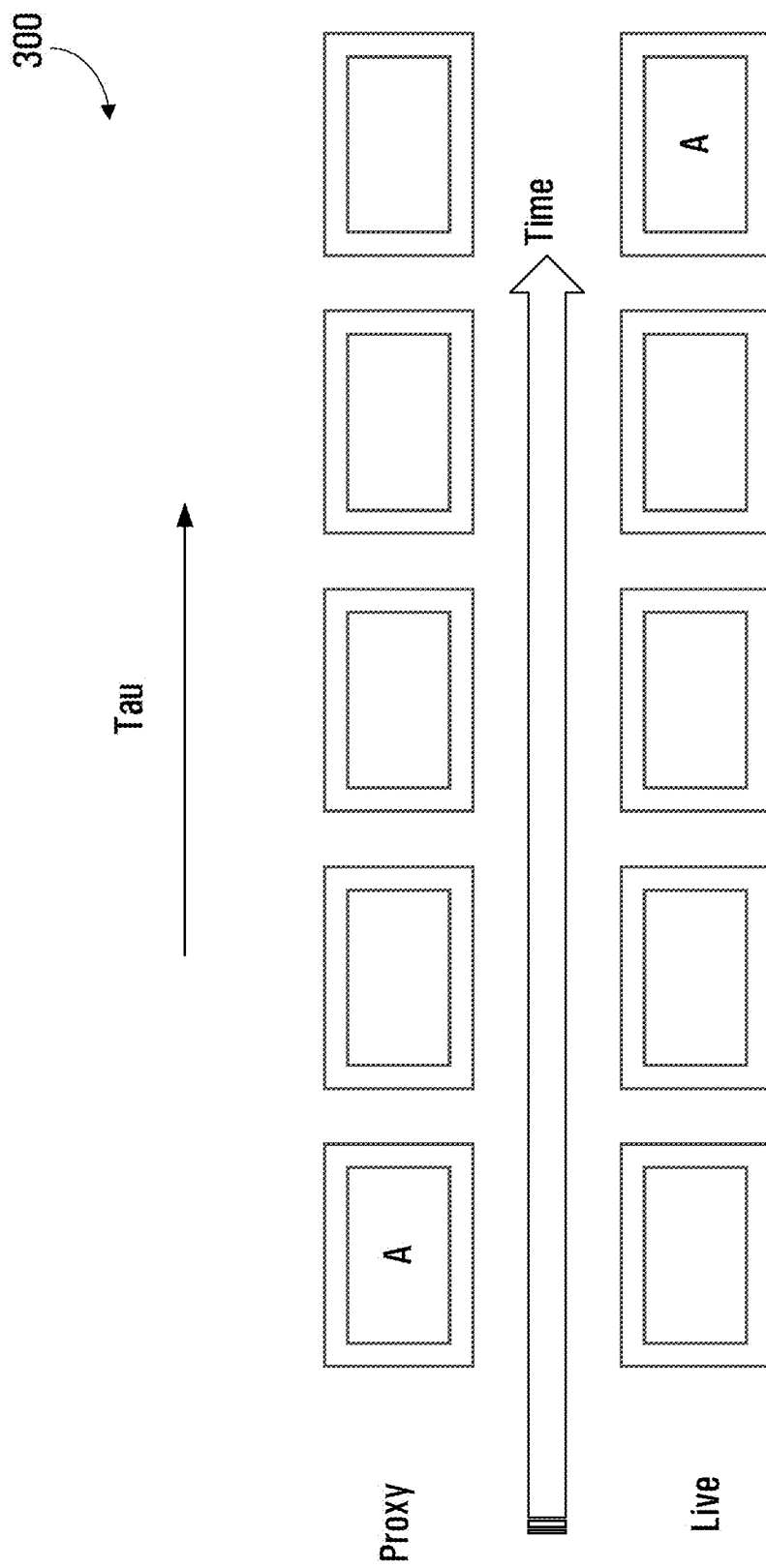
FIG. 3 is time variation diagram illustrating packet timing that may be provided as frames are received and processed, according to some embodiments.

FIG. 3 is a time variation diagram illustrating packet timing that may be provided as frames are received and processed, according to some embodiments. As illustrated in diagram 300, a frame A may be provided and may travel through the system 200. Frame A can be provided in the form of a low quality frame, with instructions given by editing component (e.g., add overlay at frame A to A+X). Based on the instructions processed, a corresponding high quality version of the stream acted upon as it passes through the system "Tau" units of time later).

Figure 4A:
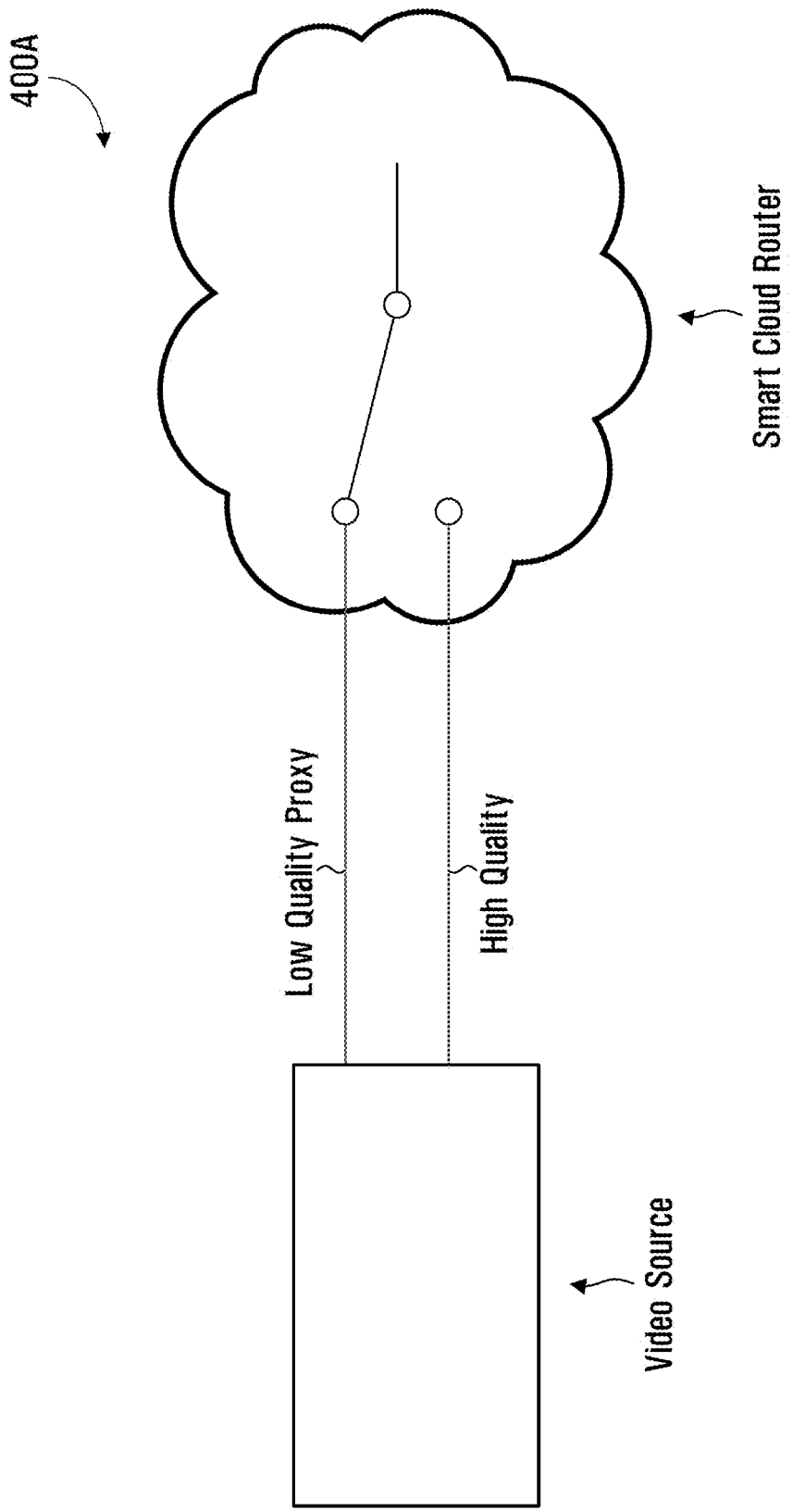
FIG. 4A is a sample schematic diagram illustrating generating the lower and higher quality streams to allow for cloud processing, according to some embodiments.

FIG. 4A is a sample workflow diagram 400A illustrating a method of generating the lower and higher quality streams 282 and 284 to allow for cloud processing, according to some embodiments.

In some embodiments, both streams 282 and 284 are provided to the distributed resources of system 200, potentially increasing or maximizing tau by gaining both the processing (less for low quality), and transmission latency time to the cloud, but at the trade-off of transmission cost (adding the low quality transmission), possibly transmission time (may take longer for high quality feed since there are two feeds overlapping) and computing power needed (need to encode both streams at the source). Inputs may include the number or type of editing resources to be applied to the stream, and the type of deadline for the stream to be transmitted to the endpoints.

Figure 4B:
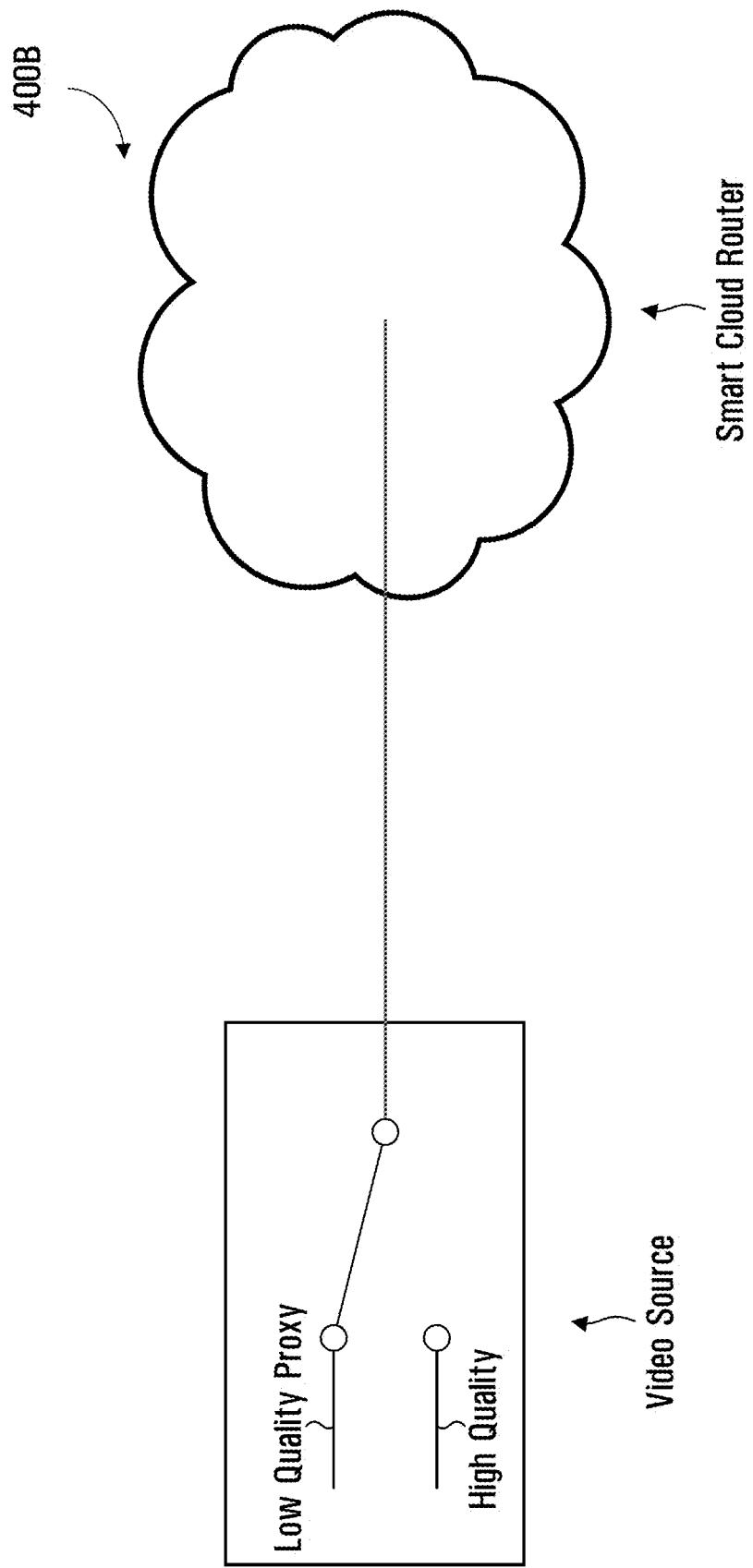
FIG. 4B is a sample schematic diagram illustrating generating the lower and higher quality streams to allow for cloud processing, according to some embodiments.

FIG. 4B is a sample schematic diagram 400B illustrative of a structure and method of generating the lower and higher quality streams 282 and 284 to allow for cloud processing, according to some embodiments. In this example, a switch is provided at the video sources. The switch may determine which stream is provided to smart cloud router, and which may be provided to other resources. Accordingly, in some examples, the two streams are not necessarily simultaneously streamed.

As depicted the low-quality stream 282 is used, and then based on a shot selection decision made in the cloud (e.g., through for instance, a system as described in U.S. patent application Ser. No. 14/329,112), an instruction back can be generated and transmitted to the selected source to quickly ramp up the video quality of that source, and when it is "un-selected" an operator could send an instruction back to the video source to ramp-down its quality. Instructions, for example, may be directed to specific coded sets of data that include representations of, for example, desired bitrates, framerates, resolutions, perhaps deciding whether or not to bother transmitting forward error correction data and/or willingness to increase latency, among others. In another embodiment, applicable to all modes of uplink, a station editor sends instructions to the transmitter or transmitter operator to perform certain edits on the content using the editing tool local to the transmitter, with the final editing points from the transmitter being sent back to the cloud (where the high quality stream may already have been uploaded and stored), for the actual performance of the edit, saving an additional upload of edited material.

This approach may be beneficial when different shots are available and there is not clarity as to which is going to be used on-air, and where an operator is looking to either reduce cost (by transmitting high quality only when it is needed, or potential congestion (which is less of an issue in the cloud than at a station where the pipe from the station to the internet is fixed).

Figure 4C:
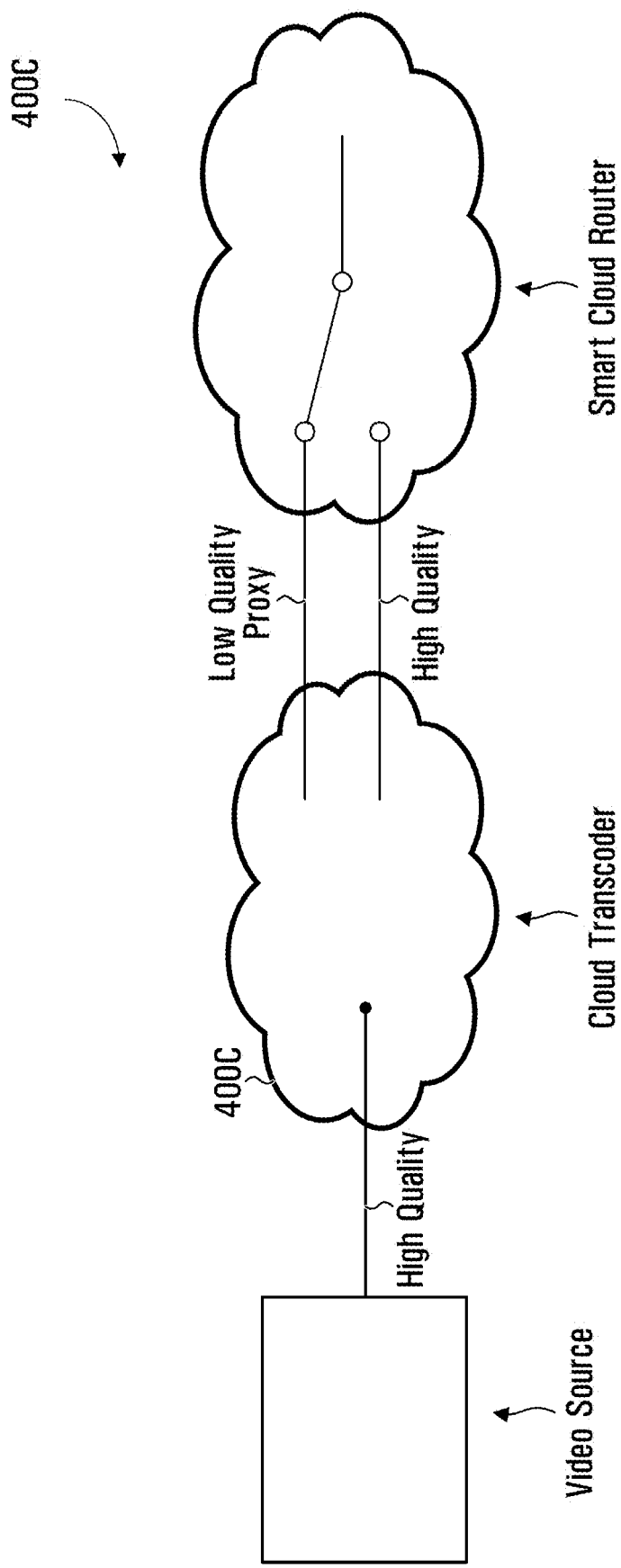
FIG. 4C is a sample schematic diagram illustrating generating the lower and higher quality streams to allow for cloud processing, according to some embodiments.

FIG. 4C is a sample schematic diagram 400C illustrative of a structure and method of generating the lower and higher quality streams 282 and 284 to allow for cloud processing, according to some embodiments. A "cloud" transcoder 402C is utilized for processing and/or encoding of a data stream.

The approach may include transmitting a full quality stream 284 from the source, and then re-encoding the low quality stream 282 once in the cloud (at an initial cloud transcoder 402C. While this approach may increase initial latency (between the original transmitter to the router), the approach may, in some scenarios, facilitate the use of presumed increased computing power in the cloud that may allow for quicker encoding of the low quality stream 282, and reduce computing power needed at the data source.

Potential advantages may include less power usage on the transmitting devices (e.g. something with battery power, for which generating multiple streams might have a high impact on the operational life of the device), and/or reducing the amount of data sent.

This approach may be particularly helpful in situations where the video source has limited initial connectivity to cloud, has limited processing power available, or is simply unable to generate multiple streams. For example, this approach may provide improvements when less time is expected to be needed for less "manual" activity (such as visual editing) and trying to reduce time from system to system. The approach reduces transmission costs (by amount of low quality preview from the source to the cloud (which may be the costliest portion of the route), as it would no longer happen) and computing power needs at the video source. Various models can be utilized, for example, a live+store and forward model can be implemented by the system, wherein a live stream with a set latency is sent into the system first, followed by a higher quality stream sent later, without concern for latency.

Figure 4D:
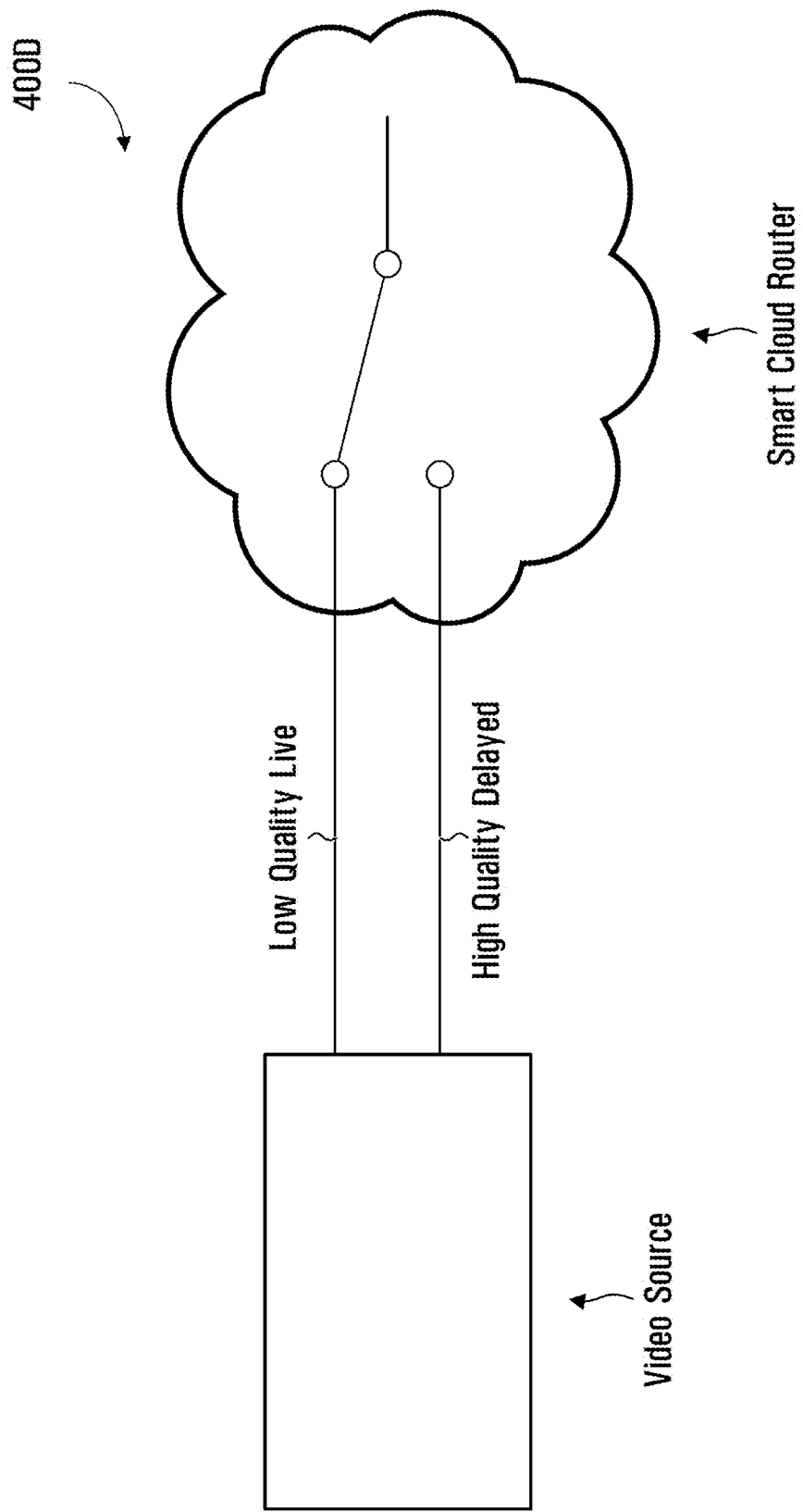
FIG. 4D is a sample schematic diagram illustrating generating the lower and higher quality streams to allow for cloud processing, according to some embodiments.

FIG. 4D is a sample schematic diagram 400D illustrating a method of generating the lower and higher quality streams 282 and 284 to allow for cloud processing, according to some embodiments.

In some embodiments, an intentional delay may be implemented (e.g., a set or variable amount) where editing activities may be known to require a longer processing time. For example, in a situation where there is a need to ensure the highest quality of "high quality" transmission is sent (for example, in relation to a Live+store and forward model).

In some embodiments, where the low quality preview and high quality version are created and how they are transported can be set based on a set of rules regarding the location of the video source, the computing power of the video source device, the network capacity between the video source and the cloud resources, etc. In some embodiments, various decision points and triggers relating to the transmission method can be made in real-time.

Intentional delays may be introduced to allow for higher quality video to be sent than would otherwise be possible (e.g., allowing more time to permit a more rigorous encoding, such as adding additional passes of the encoder on the content). Conversely, pre-emptive processing may also be utilized prior to the actual transmission time of content.

There may also be a fixed delay mandated (e.g., x seconds to allow for bleeping), or a minimum editing time which may be needed (e.g., it will take 15 seconds to perform tasks X, Y and Z) and thus it is not necessary to get the high quality video through the system immediately. Another example scenario includes where a shot for a package is made for a later broadcast, where the high quality video might not be broadcast for some time, but where the system initiates the broadcast and processing of the lower quality preview to start the editing process immediately to allow more time for editing.

In some embodiments, the transmission methods may be fixed for an entire transmission, in other embodiments the transmission method may be changed during the transmission (e.g., starts with FIG. 4B structure/method and shifts to the structure/method of FIG. 4C at some point in the stream).

Other techniques, such as multi-pass encoding are provided in some embodiments to lower an overall bitrate, and hence, save data (as opposed to increasing quality, or in addition to). A metric, such as structural similarity, can be applied to confirm the optimal picture quality given the constraint (quality or size/cost). Pre-emptive processing may be utilized, for example, to perform certain tasks (e.g., lower difficulty) processing at a transmitter, such as adding certain overlays, or conducting audio analysis. Pre-emptive processing at the transmitter may also provide a benefit by better utilizing expected network throughput or lower transmission costs.

In some embodiments, the lower quality preview stream includes bi-directional error correction packets based on errors detected in transmission of the higher quality content stream.

Uni-directional error correction may require that the sender to estimate a redundancy percentage in advance (e.g., if 5% of data is FEC, then up to 5% loss of the network can be tolerated). If the actual amount of loss differs from this estimate, then it is either inefficient (sending too much redundancy because the channel is more reliable than the estimate), or the FEC is insufficient (network is less reliable than the estimate). Bi-directional communication methods may be utilized such that the FEC percentage can be tuned in real time based on feedback.

FEC is not limited to the example of FIG. 4D, and may be implemented in conjunction with various embodiments described herein.

Figure 5A:
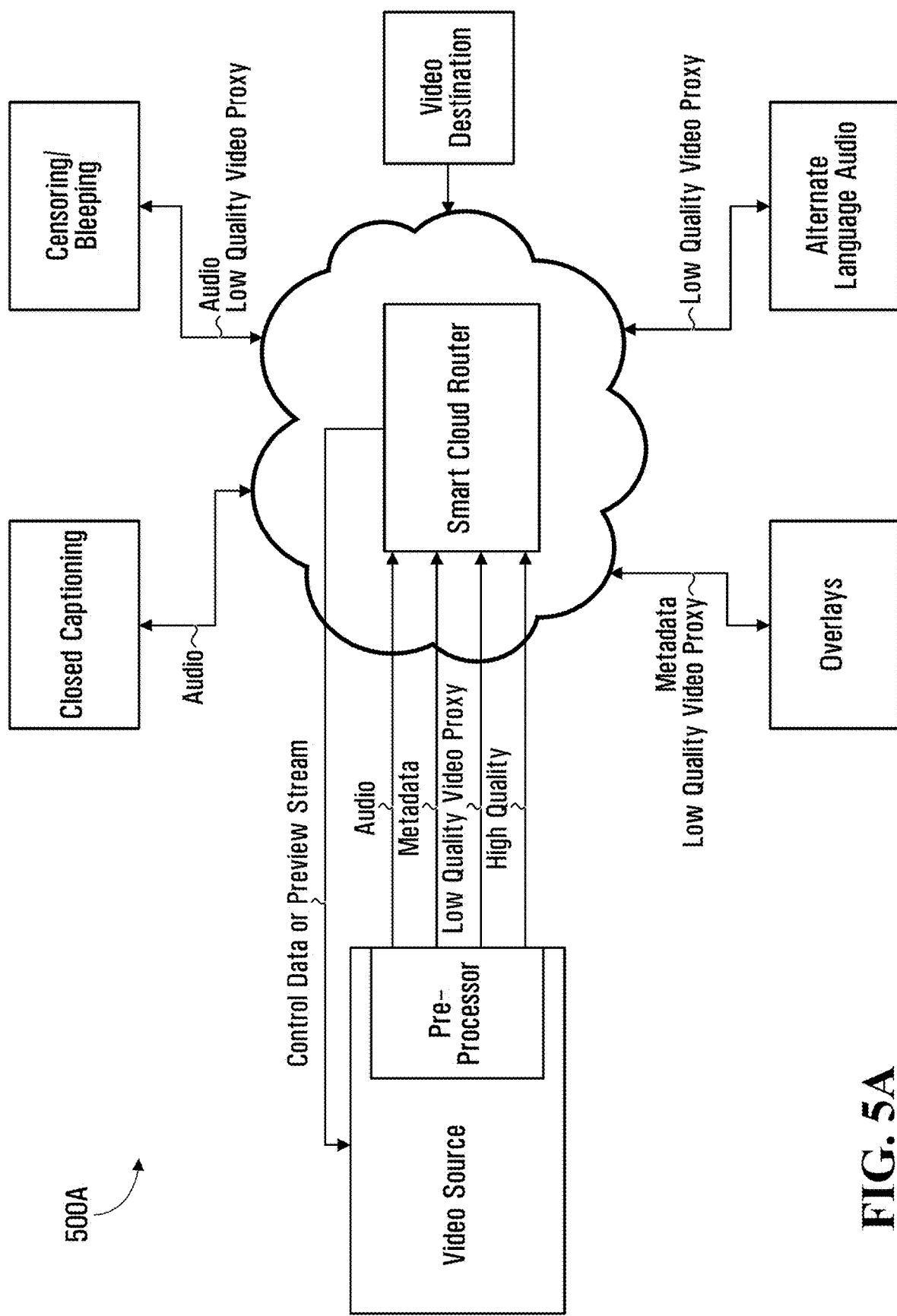
FIG. 5A is an example schematic diagram illustrating a system of separating various components relating to a video source and sending them to the relevant editing/cueing components to be acted upon.

FIG. 5A is an example schematic diagram illustrating a system configured for separating various components relating to a video source and sending them to the relevant editing/cueing components to be acted upon.

In some embodiments, there may be a requirement to separate out audio and metadata to send to different processing components (e.g., audio for closed captioning, audio and low quality video for censoring, metadata to allow for automatic overlays (e.g., location of shot)). In some embodiments, there may further be a control channel that may be provided back to the video source.

As shown in FIG. 5A, the smart cloud router shows various non-limiting examples of streams being provided to different distributed cloud computing resources for processing. The examples shown are merely examples, and other, alternate, different, more, or less process flows can be implemented by the smart cloud router. For example, sending only "Low Quality Video Proxy" only to the Alternate Language audio can be conducted in relation to a sports broadcast, where the system is configured to facilitate processing that is adapted for (e.g. Spanish) commentators to comment on what they are seeing in an otherwise English broadcast. In other instances, the system may be configured to send different data streams, such as both audio and video, or only audio (where you actually want to translate the English/first-language commentary to another.

In some embodiments, separated portions of the stream could travel to a set of processing units serially, rather than in parallel in accordance with various factors (e.g., latency, logical connection between different activities (e.g., may go to translation first, then (possibly multiple language audio streams) would go to closed captioning).

In some embodiments, certain instructions may also be transmitted back to the transmitting device to cause processing modifications or pre-processing at the transmitter (e.g., in the generation of the data streams).

In some embodiments, the scheduler/router is configured to determine the order of processing. Such determinations, for example, may be based either on a pre-determined rule set, or based on rule sets demanded or implied by the set of cloud editing resources available. For example, in some cases the stream may go through a closed captioner system X, at other times closed captioner system Y, and the software on Y might demand that certain activities happen before others, whereas X is indifferent.

A high-quality "broadcast worthy" stream may be provided that would follow the other streams or previews. The high quality stream may, for example, be provided along a pre-determined path to each of the processing units, either serially or in parallel, or it could be acted on by a headless processing unit (see FIG. 7). The headless processing unit, for example, receives back instruction sets from the other processing units (e.g., receive set of edit points as determined by an operator who had been acting on the low quality preview in advance of the arrival of the high-quality stream), thereby allowing the high quality stream to be processed (e.g., modified) in a more efficient manner.

The mechanics of generating the multiple streams (i.e. where they are generated and switched) are illustrated in the low-quality/high-quality examples of FIGS. 4A/B/C/D.

In some embodiments, some "previews" (of audio, or low quality video) may utilize different methods and approaches on the same stream (e.g., audio goes full quality from the source and is encoded at a lower bitrate when it is transmitted to the cloud (similar to that shown in FIG. 4C), but the video is provided in low quality right from the source (as in shown in FIG. 4A)) thereby allowing the high quality stream to avoid going to each of the individual editor computing devices.

Figure 5B:
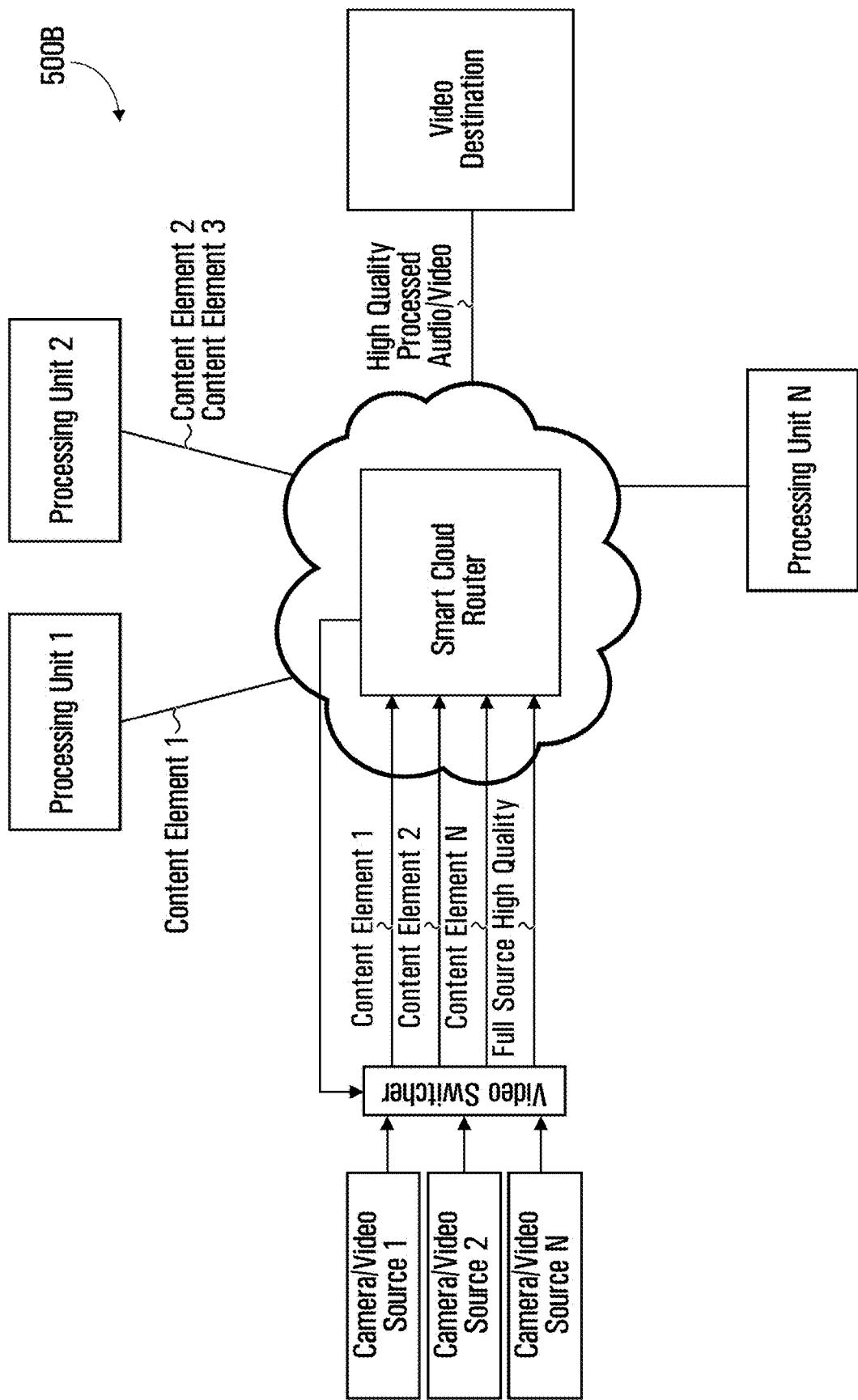
FIG. 5B is an example schematic diagram illustrating a system which includes multiple video sources which are switched prior to being sent to the smart cloud router.

FIG. 5B is an example schematic diagram 500B illustrating a system which includes multiple video sources which are switched prior to being sent to the smart cloud router.

As depicted, in some embodiments, the camera/video sources may interact with a video switcher prior to being provided to the smart cloud router. For example, the switcher may be useful in the context of a sports stadium, where there may be multiple cameras trained on different viewpoints at a single moment, but only one or more of them are being actively used to provide transmission to end users (e.g., only one camera is being used in focus). In some embodiments, the switcher may be controlled automatically based, for example, on various processing and/or network constraints. For example, security or inspection content may be utilized where the video switcher auto switches based on assessed content (switches automatically to a suspect (or asset being inspected) based on which camera has the best view or best audio).

Figure 6:
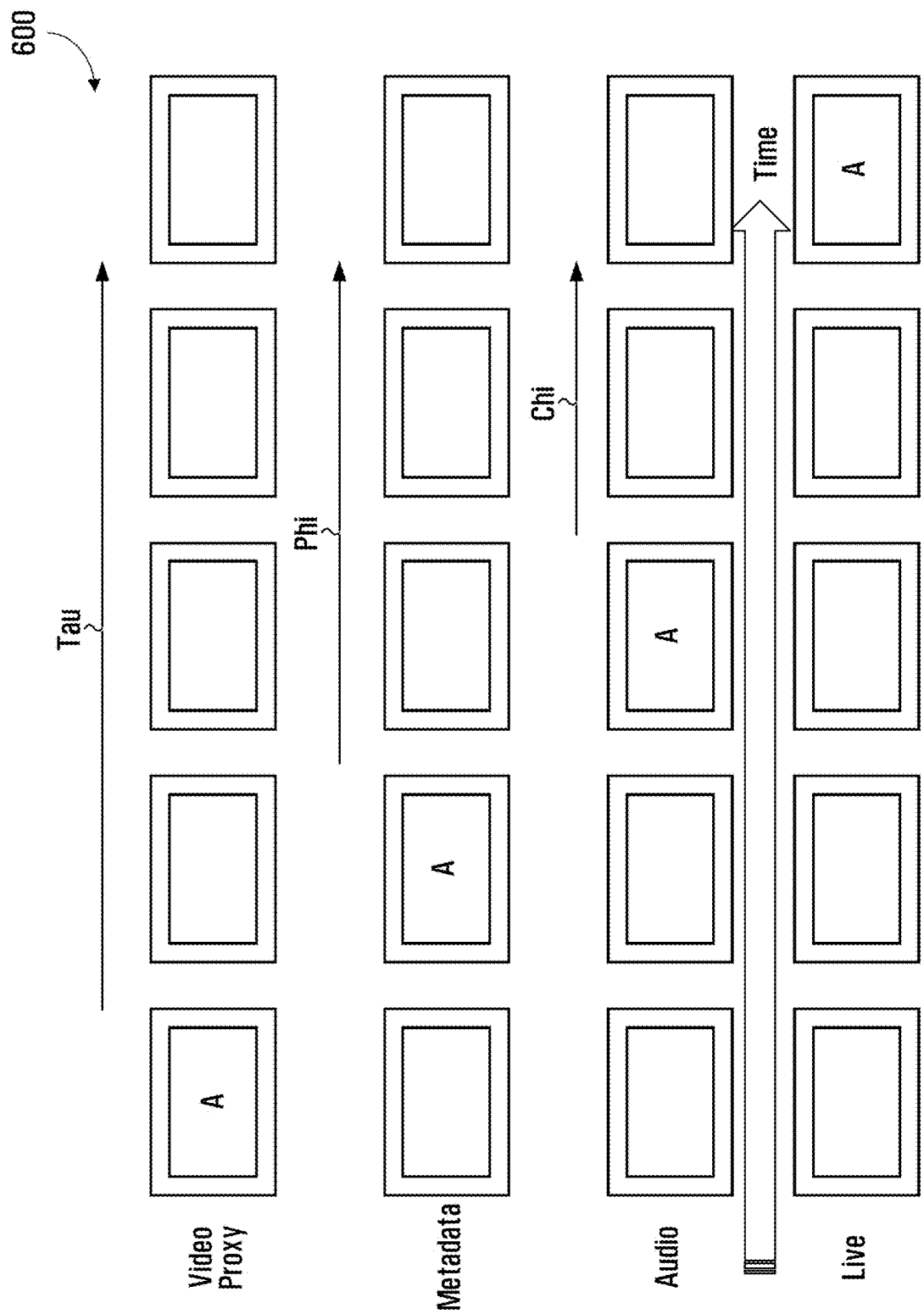
FIG. 6 is an example timing diagram illustrating enabling the real-time processing of a video stream by using lower and higher quality video streams along with separate audio and metadata streams to allow for parallel cloud processing, according to some embodiments.

FIG. 6 is an example schematic diagram 600 illustrating an approach for enabling the real-time processing of a video stream by using lower and higher quality video streams along with separate audio and metadata streams to allow for parallel cloud processing, according to some embodiments. As depicted in FIG. 6, each of the signals may include separate latencies to manage (e.g., for example, in some situations, the system 200 may be able to provide metadata very quickly allowing for more time to use it). In contrast with FIG. 3, there may be more than Tau, and additional latencies for other streams may be represented in the form of "Phi", and/or "Chi". As depicted in FIG. 6, the frame A may not be in the same "time" as the frames of data are being processed in by the distributed resources. While several different latencies are depicted, there may be "n" latency values for "n" different elements.

These multiple latencies may be balanced and/or used for control/scheduling. At the end of the pipeline, concurrent streams of data with their differing latencies must be put back together for consumption. Some streams may require to be very closely synchronized (e.g. audio and video), so that the viewer consuming it sees the audio match the video. Other streams (e.g. metadata, closed captioning) may have looser constraints on synchronization for which the scheduler can take advantage in order to optimize for the goal function (e.g. lowest processing cost).

Figure 7:
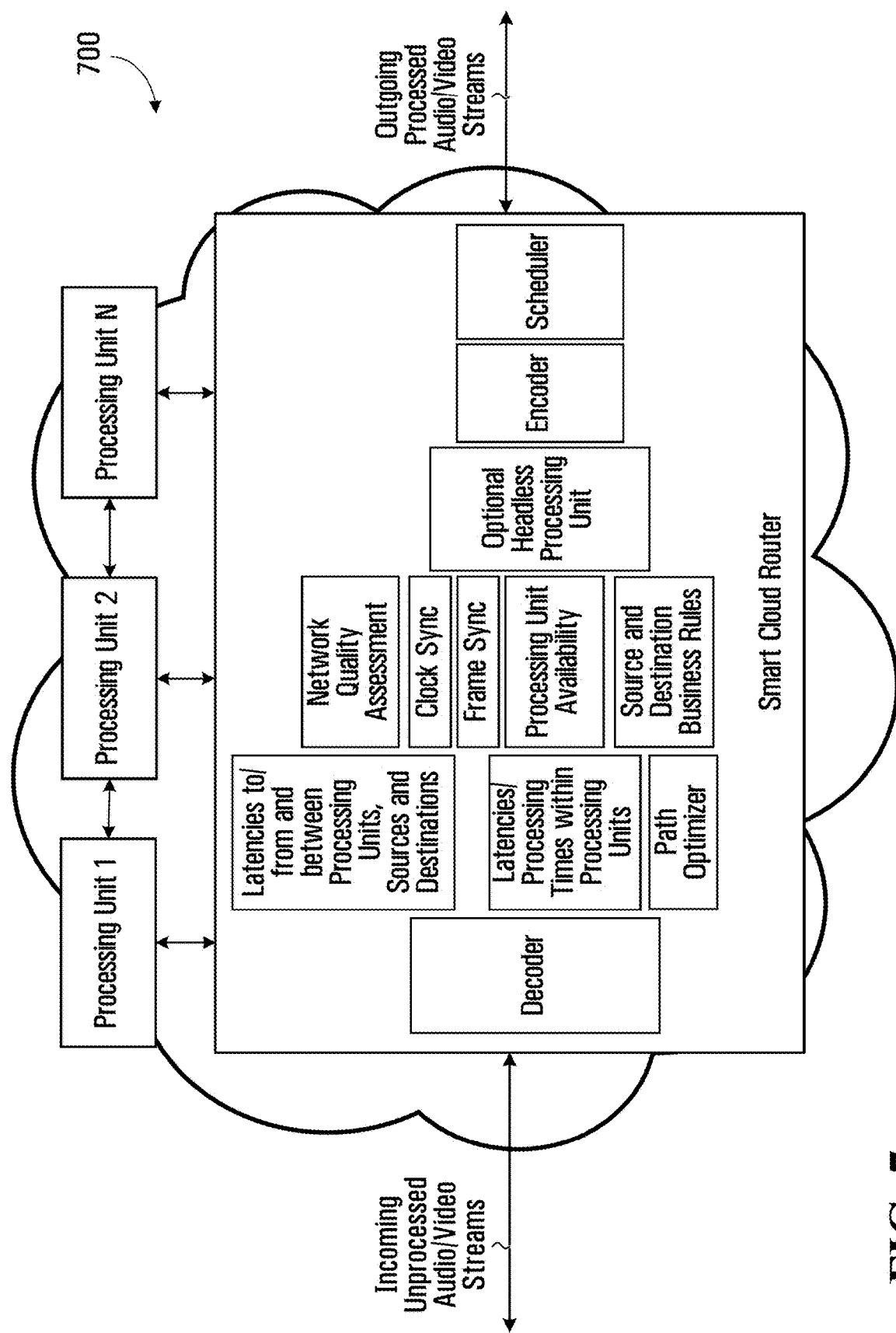
FIG. 7 is an example schematic diagram illustrating a system containing elements of a smart routing system, according to some embodiments.

FIG. 7 is an example schematic illustrating a system 700 containing elements of a smart routing system, according to some embodiments. As illustrated, the "smart cloud router" may be a system as provided in FIGS. 2A, 2B, 2C, for example, and have various features and configurations. The system may be configured to track synchronization, availability, perform load balancing, perform processing in a "headless" manner, perform encoding, perform scheduling, monitor operational characteristics such as latencies, processing time, conduct path optimization, among others. The use of a distributed resources "cloud based" solution may provide for increased redundancy, scalability, expandability, pay-for-use etc., but also provides a challenge of not having control of the full environment, and possibility for greater latencies between components.

Headless operations, in some embodiments, are conducted by the headless unit applying instructions generated by other processing units (as opposed to generating its own instructions).

The components as depicted in the "cloud"/distributed resources environment may be provided in various locations, such as being co-located in a single cloud location, or could be distributed in various locations (including some elements remaining in a physical control room of as depicted in FIG. 1).

Figure 8A:
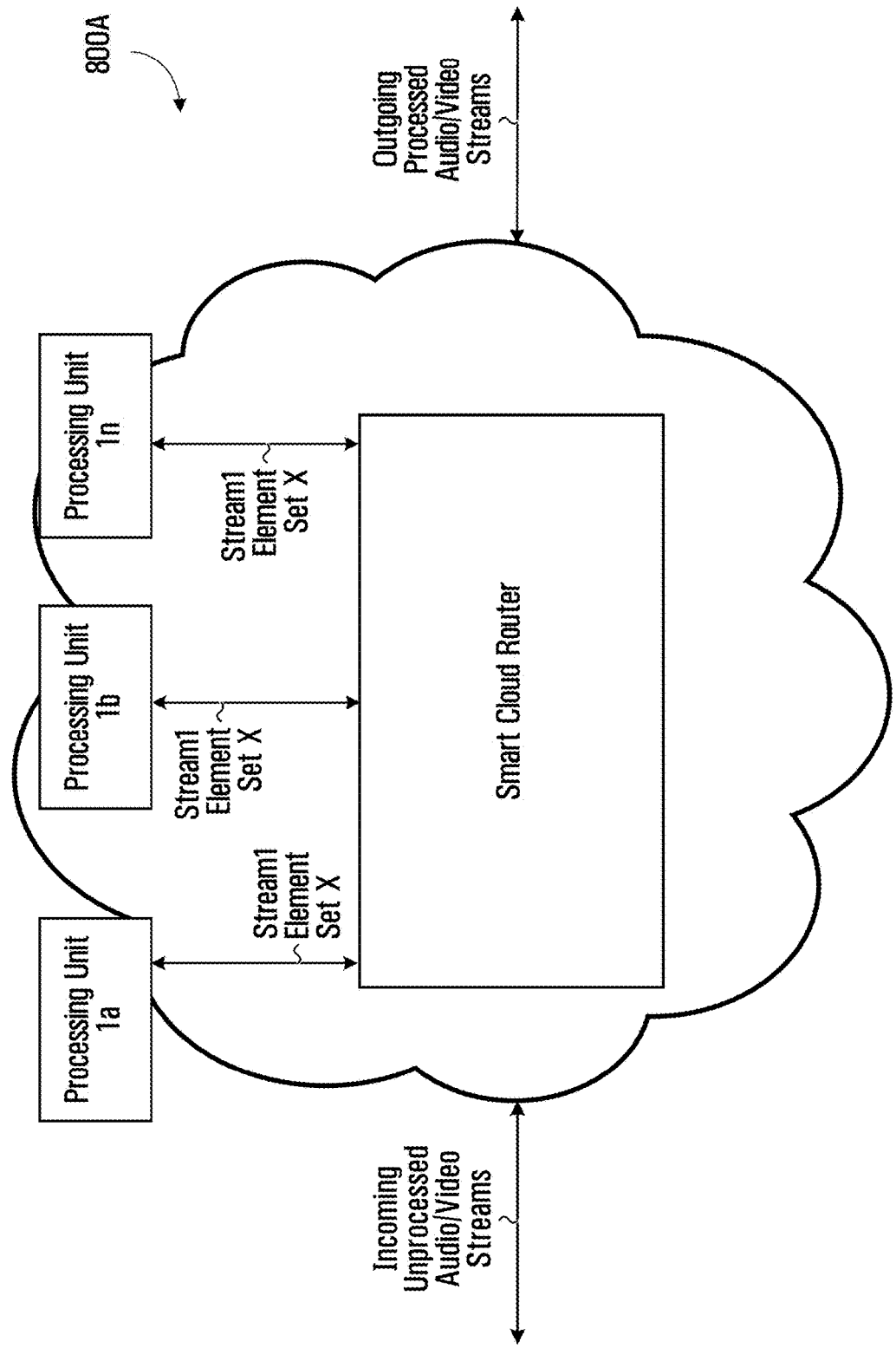
FIG. 8A is an example schematic diagram illustrating a system providing redundancy on the basis of sending stream elements to a multiplicity of identical processing units.

FIG. 8A is an example schematic illustrating a system providing redundancy on the basis of sending stream elements to a multiplicity of identical processing units. FIG. 8 provides a visual representation of one method of having redundancy (by having the stream sent to multiple processing units of the same type/function, e.g., send same audio stream to three closed captioning servers, take three streams back (and sequence them throwing out redundant packets)).

A multiplicity of processing units may be useful in a situation where high availability trumps all other factors (e.g. cost). If the processing units are identical, in the normal case where none of them have failed results in redundant effort that is discarded. But if a processing unit and/or network communication with that unit fails, the redundant units will be able to compensate for the failure.

Figure 8B:
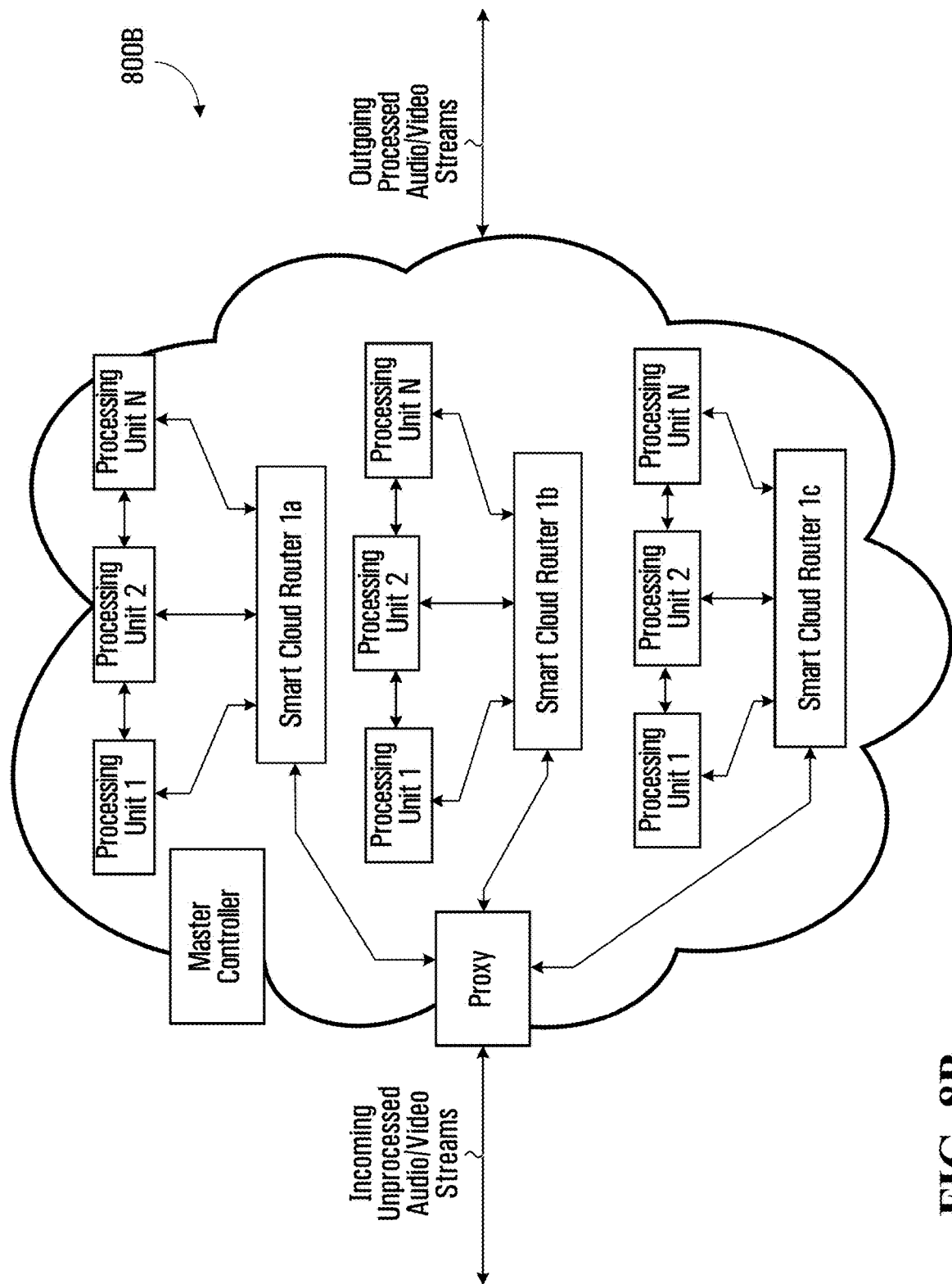
FIG. 8B is an example schematic diagram illustrating a system providing redundancy on the basis of sending streams to a multiplicity of identical smart routers.

FIG. 8B is an example schematic illustrating a system providing redundancy on the basis of sending streams to a multiplicity of identical smart routers, according to some embodiments. FIG. 8B provides a visual representation of redundancy at an earlier stage by sending to multiple cloud routers, and a master controller 802 is provided that is connected to various components and is configured to monitor the different smart routers and give routing info to the proxy, among others.

In some embodiments, frames might be held at the end of the process (prior to broadcast) in order to hit the times listed in a given station's program schedule (for example, aspects such as ad insertion etc., happen at set times within a separate schedule).

Figure 9:
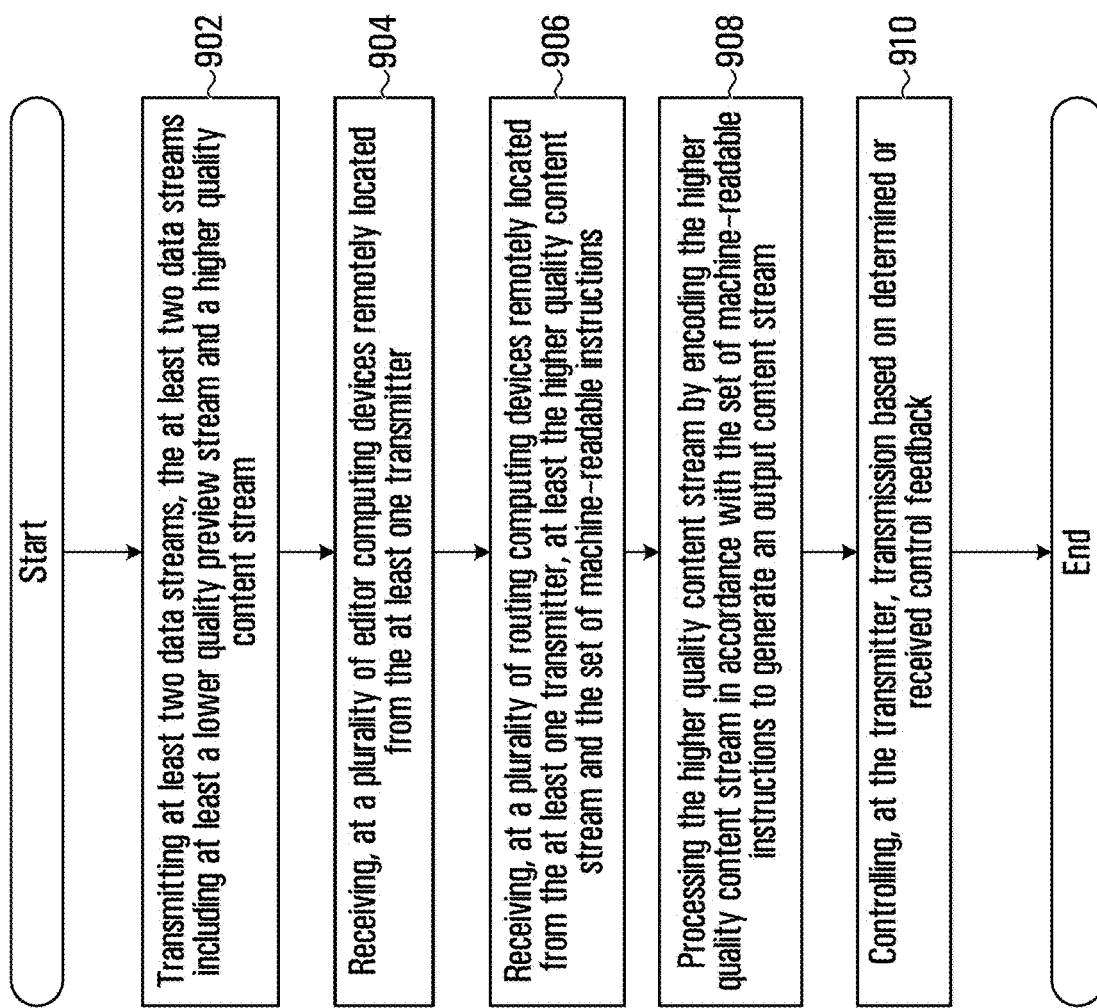
FIG. 9 is a workflow illustrating a sample approach for remote processing, according to some embodiments.

FIG. 9 is a workflow illustrating a sample approach for remote processing, according to some embodiments.

A method 900 for remotely processing data streams is depicted, the method including steps of 902 transmitting at least two data streams, the at least two data streams including at least a lower quality preview stream and a higher quality content stream.

At 904 receiving, at a plurality of editor computing devices remotely located from the at least one transmitter, at least the lower quality preview stream, the plurality of editor computing devices configured for facilitating processing and editing on the lower quality preview stream, the processing and editing being used to generate a set of machine-readable instructions representative of the processing and editing.

At 906, receiving, at a plurality of routing computing devices remotely located from the at least one transmitter, at least the higher quality content stream and the set of machine-readable instructions, the plurality of routing computing devices configured for, at 908, processing the higher quality content stream by encoding the higher quality content stream in accordance with the set of machine-readable instructions to generate an output content stream.

The higher quality content stream may not entirely match the content of the lower quality preview. In some embodiments, it possible for a "rough cut" to occur based on the preview, such that only selected portions of the high quality stream need to be transmitted, which may reduce cost, latency, and/or transmission time among other benefits. At 910, control signals may be returned to the transmitter based on received control feedback.

Figure 10:
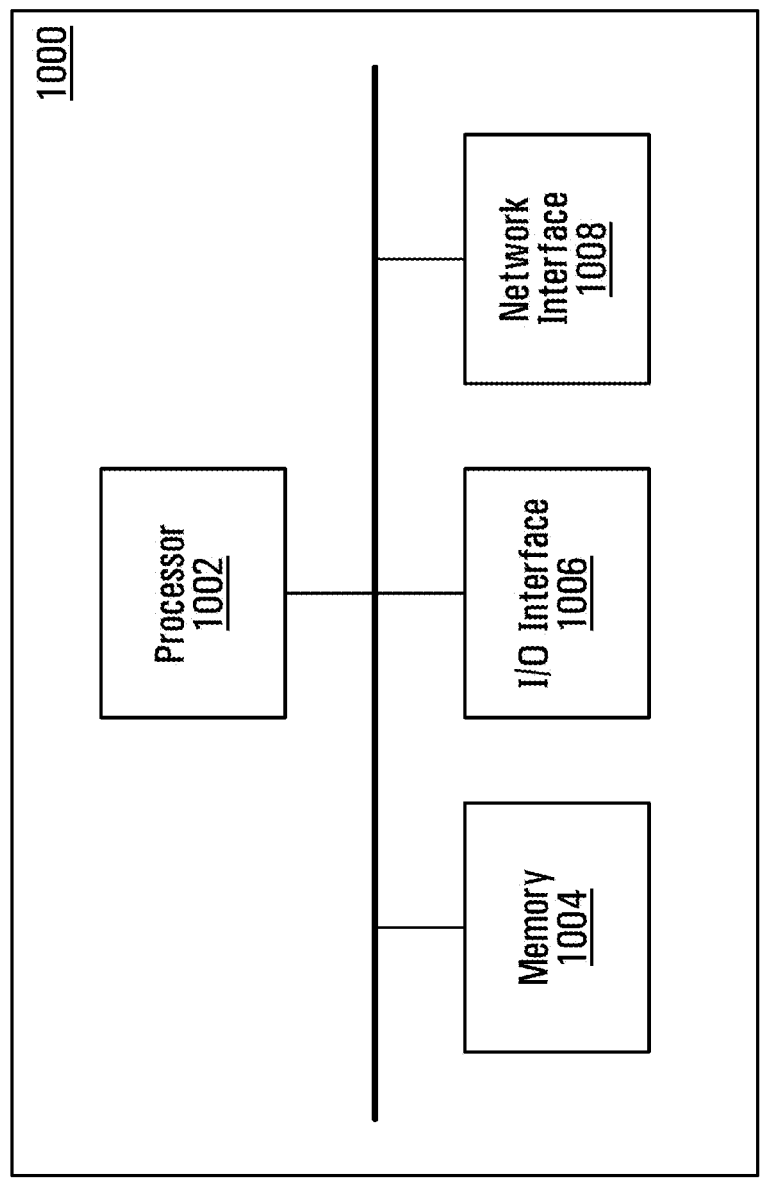
FIG. 10 is a schematic diagram of computing device, exemplary of an embodiment.

FIG. 10 is a schematic diagram of computing device 1000, exemplary of an embodiment. As depicted, computing device 1000 includes at least one processor 1002, memory 1004, at least one I/O interface 1006, and at least one network interface 1008.

Each processor 1002 may be, for example, a microprocessor or microcontroller, a digital signal processing (DSP) processor, an integrated circuit, a field programmable gate array (FPGA), a reconfigurable processor, a programmable read-only memory (PROM), or any combination thereof.

Memory 1004 may include a combination of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 1006 enables computing device 1000 to interconnect with one or more input devices, such as a keyboard, mouse, camera, touch screen and a microphone, or with one or more output devices such as a display screen and a speaker.

Each network interface 1008 enables computing device 1000 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including combinations of these.

In a separate embodiment, a special purpose machine is configured and provided for use. Such a special purpose machine is configured with a limited range of functions, and is configured especially to provide features in an efficient device that is programmed to perform particular functions pursuant to instructions from embedded firmware or software. In this embodiment, the special purpose machine does not provide general computing functions. For example, a specific device, including a controller board and scheduler may be provided in the form of an integrated circuit, such as an application-specific integrated circuit.

This application-specific integrated circuit may include programmed gates that are combined together to perform complex functionality as described above, through specific configurations of the gates. These gates may, for example, form a lower level construct having cells and electrical connections between one another. A potential advantage of an application-specific integrated circuit is improved efficiency, reduced propagation delay, and reduced power consumption. An application-specific integrated circuit may also be helpful to meet miniaturization requirements where space and volume of circuitry is a relevant factor.

The invention claimed is:

1. A system for controlling data stream modifications, the system comprising:
  a router configured to receive a first data stream, and to generate, based on the first data stream, one or more sets of processing instructions for modifying a second data stream;
  a data stream encoder configured to receive the second data stream and to apply one or more data modifications based at least on executing the one or more sets of processing instructions in processing the second data stream, the data stream encoder generating an output processed stream including the data modifications;
  wherein the first data stream and the second data stream are both derived from a source video data stream;
  wherein receipt of the corresponding frames of the first data stream and the corresponding frames of the second data stream is temporally shifted relative to one another at least in part due to one or more encoding differences between the first data stream and the second data stream; and wherein the receipt of corresponding frames of the first data stream by the router occurs ahead of the receipt of corresponding frames of the second data stream by the data stream encoder.

2. The system of claim 1, wherein the second data stream is a production quality data stream generated from the source video data stream, and the second data stream is selected from a plurality of candidate data streams based on a shot selection decision during the generation of the one or more sets of processing instructions.

3. The system of claim 1, comprising:
at least one receiver configured to receive the first data stream and the second data stream as separate data streams.

4. The system of claim 1, comprising:
at least one receiver configured to receive the source video data stream; and
a first encoder configured to generate the first data stream from the source video data stream; and
a second encoder configured to generate the second data stream from the source video data stream;
wherein the first data stream is generated at a lower bitrate than the second data stream.

5. The system of claim 4, wherein the second encoder delays transmission of the second data stream to the data stream encoder to cause temporal shifting of the receipt of the corresponding frames of the second data stream relative to the corresponding frames of the first data stream.

6. The system of claim 4, wherein operating characteristics of at least one of the first encoder and the second encoder are controllable to modify a time delay between the receipt of the corresponding frames of the first data stream and the corresponding frames of the second data stream.

7. The system of claim 1, wherein the router and the data stream encoder are configured for operation in a master-slave configuration, whereby the one or more sets of processing instructions represent uni-directional processing steps for execution by the data stream encoder;
wherein differences in encoding between the first data stream and the second data stream result in a minimum time delay between the receipt of the corresponding frames of the first data stream and the corresponding frames of the second data stream; and
wherein the router is configured for identifying data modifications and generating the one or more sets of processing instructions representing the identified data modifications, which when executed by the data stream encoder, transform the second data stream into the output processed stream.

8. The system of claim 7, wherein the router is configured to generate the one or more sets of processing instructions within a temporal constraint defined at least by the temporal shift between the receipt the corresponding frames of the first data stream and the corresponding frames of the second data stream.

9. The system of claim 8, wherein each set of the one or more sets of processing instructions for modifying the second data stream includes at least a data structure having frame identifiers of frames of the second data stream selected for modification, and image or audio manipulation instructions associated with the selected frames of the second data stream.

10. The system of claim 1, wherein the router is further configured to transmit at least one of the first data stream and the one or more sets of processing instructions for rendering on a preview visualization display screen.

11. The system of claim 8, comprising:
a orchestration coordination router configured for coordinating processing of the second data stream such that the generation of the output processed stream including the data modifications occurs within the temporal constraint.

12. The system of claim 11, wherein the orchestration coordination router is configured for selecting, from a plurality of cloud computing resources, a subset of the plurality of cloud computing resources for implementing or for use by at least one of the router and the data stream encoder.

13. The system of claim 12, wherein the orchestration coordination router is further configured to control one or more networking connections between the cloud computing resources of the plurality of cloud computing resources, the orchestration coordination router controlling the one or more networking connections to modify an overall time required for generating one or more sets of processing instructions, the overall time falling within the temporal constraint.

14. The system of claim 13, wherein each cloud computing resource of the plurality of cloud computing resources is associated with corresponding geospatial characteristics, and wherein the orchestration coordination router, selects the subset of the plurality of cloud computing resources based at least in part on the geospatial characteristics of each cloud computing resource.

15. The system of claim 14, wherein the orchestration coordination router is configured to allocate specific cloud computing resources when required for processing, and configured to release the allocated cloud computing resources when the processing is complete.

16. The system of claim 15, wherein the orchestration coordination router is configured to allocate and subsequently release a rolling set of cloud computing resources selected from time-zone regions having off-peak usage.

17. The system of claim 14, wherein the geospatial characteristics of each cloud computing resource includes at least one of a geographical location, a time zone, and a networking latency for communications to and from the corresponding cloud computing resource.

18. The system of claim 17, wherein the orchestration coordination router, upon a determination that the processing is likely to exceed the temporal constraint given a present set of conditions, is configured to request prioritized networking resources.

19. The system of claim 11, wherein the orchestration coordination router is configured to control a duration of the temporal shift between the first data stream and the second data stream.

20. The system of claim 12, wherein the generation of the one or more sets of processing instructions is conducted across a chain of cloud computing resources formed by the subset of the plurality of cloud computing resources, and wherein an expected end to end latency is periodically determined by aggregating a network latency from a source transmitter, a processing time required at each of the cloud computing resources, one or more network latencies between each of the cloud computing resources, and a network latency to the data stream encoder; and
wherein upon a determination that the expected end to end latency is greater than the temporal constraint, the orchestration coordination router is configured to initiate compensation actions to reduce the expected end to end latency such that the expected end to end latency falls within the temporal constraint.

21. A method for controlling data stream modifications, the method comprising:
  receiving a first data stream at a controlling device;
  generating, based on the first data stream, one or more sets of processing instructions for modifying a second data stream;
  receiving the second data stream at a data stream processing device;
  applying one or more data modifications based at least on executing the one or more sets of processing instructions in processing the second data stream; and
  generating an output processed stream including the data modifications;
  wherein the first data stream and the second data stream are both derived from a source video data stream;
  wherein receipt of the corresponding frames of the first data stream and the corresponding frames of the second data stream is temporally shifted relative to one another at least in part due to one or more encoding differences between the first data stream and the second data stream; and
  wherein the receipt of corresponding frames of the first data stream by the controlling device occurs ahead of the receipt of corresponding frames of the second data stream by the data stream processing device.

22. A non-transitory computer-readable medium storing machine readable instructions, which when executed by a processor, cause the processor to execute steps of a method for controlling stream data modifications, the method comprising:
  receiving a first data stream at a controlling device;
  generating, based on the first data stream, one or more sets of processing instructions for modifying a second data stream;
  receiving the second data stream at a data stream processing device;
  applying one or more data modifications based at least on executing the one or more sets of processing instructions in processing the second data stream; and
  generating an output processed stream including the data modifications;
  wherein the first data stream and the second data stream are both derived from a source video data stream;
  wherein receipt of the corresponding frames of the first data stream and the corresponding frames of the second data stream is temporally shifted relative to one another at least in part due to one or more encoding differences between the first data stream and the second data stream; and
  wherein the receipt of corresponding frames of the first data stream by the controlling device occurs ahead of the receipt of corresponding frames of the second data stream by the data stream processing device.

23. An orchestration coordination router for coordinating processing of a second data stream such that generation of an output processed stream including data modifications occurs within a temporal constraint, the orchestration coordination router comprising:
  a data storage configured to maintain a data structure storing one or more processing characteristics of a plurality of cloud computing resources and one or more network characteristics of a plurality of network connections;
  a first set of network interfaces coupling a processor to a transmitter configured to:
  generate a first data stream provided to a router configured for generating, based on the first data stream, one or more sets of processing instructions for modifying the second data stream; and
  generate the second data stream;
  a second set of network interfaces coupling the processor to each cloud computing resource of the plurality of cloud computing resources;
  the processor configured to:
  select a subset of the plurality of cloud computing resources for generating the one or more sets of processing instructions representing the identified data modifications;
  transmit control signals for coordinating processing of the second data stream by the subset of cloud computing resources such that the generating of the one or more sets of processing instructions occurs within a temporal constraint defined at least by a temporal shift between the receipt the corresponding frames of the first data stream and the corresponding frames of the second data stream;
  continuously monitor the one or more processing characteristics and the one or more network characteristics to determine an expected end to end latency; and
  responsive to a determination that the expected end to end latency is greater than the temporal constraint, initiate compensation actions to reduce the expected end to end latency such that the expected end to end latency falls within the temporal constraint;
  wherein the first data stream and the second data stream are both derived from a source video data stream; and
  wherein generation, by the transmitter, of the corresponding frames of the first data stream and the corresponding frames of the second data stream is temporally shifted relative to one another at least in part due to one or more encoding differences between the first data stream and the second data stream.

24. A router for receiving a first data stream and for generating, based on the first data stream, one or more sets of processing instructions for modifying a second data stream to generate an output data stream, the router comprising:
  network interfaces connecting the router to a subset of cloud computing resources selected from a plurality of cloud computing resources for generating the one or more sets of processing instructions representing a set of identified data modifications;
  a processor configured to coordinate generation of the one or more sets of processing instructions by the subset of cloud computing resources such that the generation of the one or more sets of processing instructions occurs within a temporal constraint defined at least by a temporal shift between generation of corresponding frames of the first data stream and corresponding frames of a second data stream.

* * * * *

UNITED STATES PATENT AND TRADEMARK OFFICE
CERTIFICATE OF CORRECTION

| | | |
|---|---|---|
| PATENT NO. | : 11,792,449 B2 | Page 1 of 1 |
| APPLICATION NO. | : 17/849471 | |
| DATED | : October 17, 2023 | |
| INVENTOR(S) | : David Sze et al. | |

It is certified that error appears in the above-identified patent and that said Letters Patent is hereby corrected as shown below:

On the Title Page

"Related U.S. Application Data
(63) Continuation of application No.16/322,850, filed as application No.PCT/CA2017/050930 on Aug.3, 2016, now Pat.No.11,375,249. (Continued)"

Should read as:
"Related U.S. Application Data
(63) Continuation of application No. 16/322,850, filed as application No. PCT/CA2017/050930 on Aug. 3, 2017, now Pat. No. 11,375,249. (Continued)"

Signed and Sealed this
Twelfth Day of November, 2024

Katherine Kelly Vidal
*Director of the United States Patent and Trademark Office*